(12) United States Patent
Hosseini et al.

(10) Patent No.: US 11,448,736 B2
(45) Date of Patent: Sep. 20, 2022

(54) SWITCHABLE COHERENT PIXEL ARRAY FOR FREQUENCY MODULATED CONTINUOUS WAVE LIGHT DETECTION AND RANGING

(71) Applicant: OURS Technology, LLC, Mountain View, CA (US)

(72) Inventors: Amir Hosseini, San Jose, CA (US); Sen Lin, Santa Clara, CA (US); Andrew Steil Michaels, Santa Clara, CA (US)

(73) Assignee: OURS Technology, LLC, Mountain View, CA (US)

( * ) Notice: Subject to any disclaimer, the term of this patent is extended or adjusted under 35 U.S.C. 154(b) by 0 days.

(21) Appl. No.: 17/486,692

(22) Filed: Sep. 27, 2021

(65) Prior Publication Data
US 2022/0011409 A1    Jan. 13, 2022

Related U.S. Application Data

(63) Continuation of application No. PCT/US2020/025042, filed on Mar. 26, 2020.

(60) Provisional application No. 62/940,790, filed on Nov. 26, 2019, provisional application No. 62/849,807, filed on May 17, 2019, provisional application No. 62/845,149, filed on May 8, 2019, provisional application No. 62/845,147, filed on May 8, 2019,
(Continued)

(51) Int. Cl.
*G01S 7/481* (2006.01)
*G01S 17/931* (2020.01)
*G01S 7/491* (2020.01)

(52) U.S. Cl.
CPC .......... *G01S 7/4818* (2013.01); *G01S 7/4811* (2013.01); *G01S 7/491* (2013.01); *G01S 17/931* (2020.01)

(58) Field of Classification Search
None
See application file for complete search history.

(56) References Cited

U.S. PATENT DOCUMENTS 7,369,721 B2 * 5/2008 Miller ................ G01S 7/4818
                                                      385/115
2010/0103084 A1 4/2010 Oto
(Continued)

OTHER PUBLICATIONS

International Searching Authority, Patent Cooperation Treaty, Written Opinion of the International Searching Authority, European Application No. PCT/US2020/25042, dated May 28, 2020, 9 pages.
(Continued)

*Primary Examiner* — Eric L Bolda
(74) *Attorney, Agent, or Firm* — Freestone Intellectual Property Law PLLC; Aaron J. Visbeek; Andrew J. Cameron

(57) ABSTRACT

A LIDAR transceiver includes an input port, optical antennas, an optical switch, splitters, and mixers. The optical switch switchably couples an input port to the optical antennas. For at least one optical path from the input port to one of the optical antennas, a splitter is coupled along the optical path. The splitter splits a received portion of a laser signal into a local oscillator signal and a transmit signal and outputs a return signal that is a portion of the reflected signal. The transmit signal is emitted through the optical antenna and a reflection of the transmit signal is received through the optical antenna as a reflected signal.

19 Claims, 18 Drawing Sheets

Related U.S. Application Data provisional application No. 62/826,536, filed on Mar. 29, 2019, provisional application No. 62/826,528, filed on Mar. 29, 2019.

(56) References Cited

U.S. PATENT DOCUMENTS

| | | | |
|---|---|---|---|
| 2010/0128243 A1* | 5/2010 | Liebman | G01S 7/4813 |
| | | | 356/3 |
| 2013/0166113 A1* | 6/2013 | Dakin | G01P 13/025 |
| | | | 356/28 |
| 2014/0078491 A1 | 3/2014 | Eisele et al. | |
| 2014/0376001 A1* | 12/2014 | Swanson | G02B 6/02042 |
| | | | 356/479 |
| 2016/0299228 A1* | 10/2016 | Maleki | H01S 5/0085 |
| 2018/0224547 A1 | 8/2018 | Crouch et al. | |
| 2018/0267250 A1 | 9/2018 | Hosseini et al. | |
| 2019/0025430 A1* | 1/2019 | Rohani | G01S 17/89 |
| 2019/0064358 A1 | 2/2019 | Desai et al. | |
| 2020/0025884 A1* | 1/2020 | Sugita | G02B 6/32 |
| 2021/0141058 A1* | 5/2021 | Piggott | G01S 17/34 |

OTHER PUBLICATIONS

International Searching Authority, Patent Cooperation Treaty, European Application No. PCT/US20/25042, dated Jun. 26, 2020, 2 pages.
International Searching Authority, Patent Cooperation Treaty, Written Opinion of the International Searching Authority, European Application No. PCT/US20/25042 dated Jun. 26, 2020, 9 pages.
Kim, G, et al. "Suitable Combination of Direct intensity Modulation and Spreading Sequence for LIDAR with Pulse Coding" Sensors Journal, Nov. 30, 2018, 18,4201; doi:10.3390/s18124201; p. 22.

\* cited by examiner

Single polarization (bpd version)

Single polarization (hybrid version)

Polarization splitting (bpd version)

Polarization splitting (hybrid version)

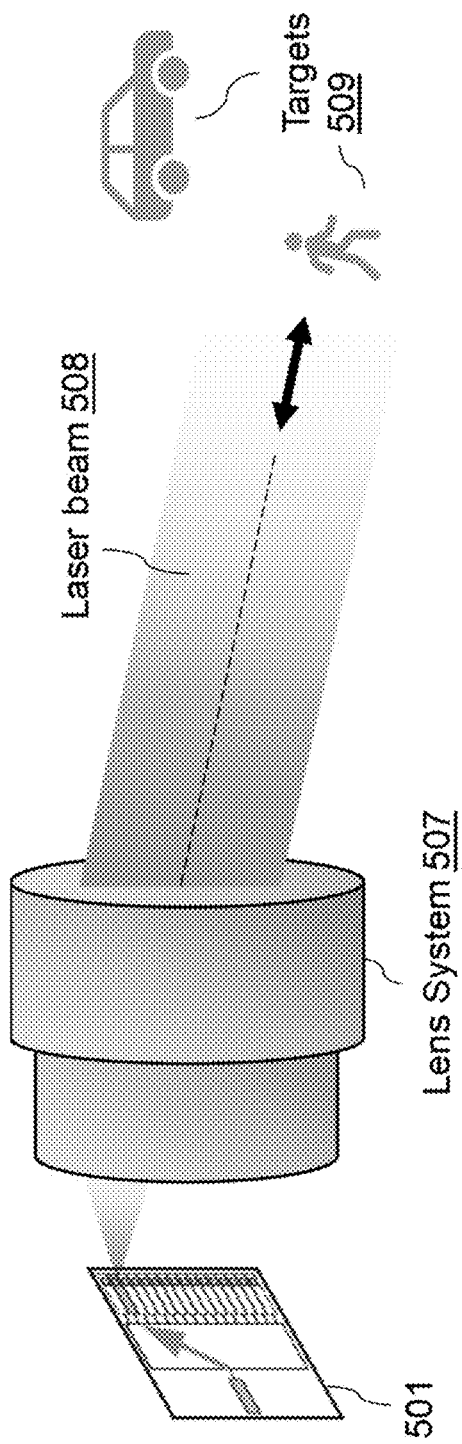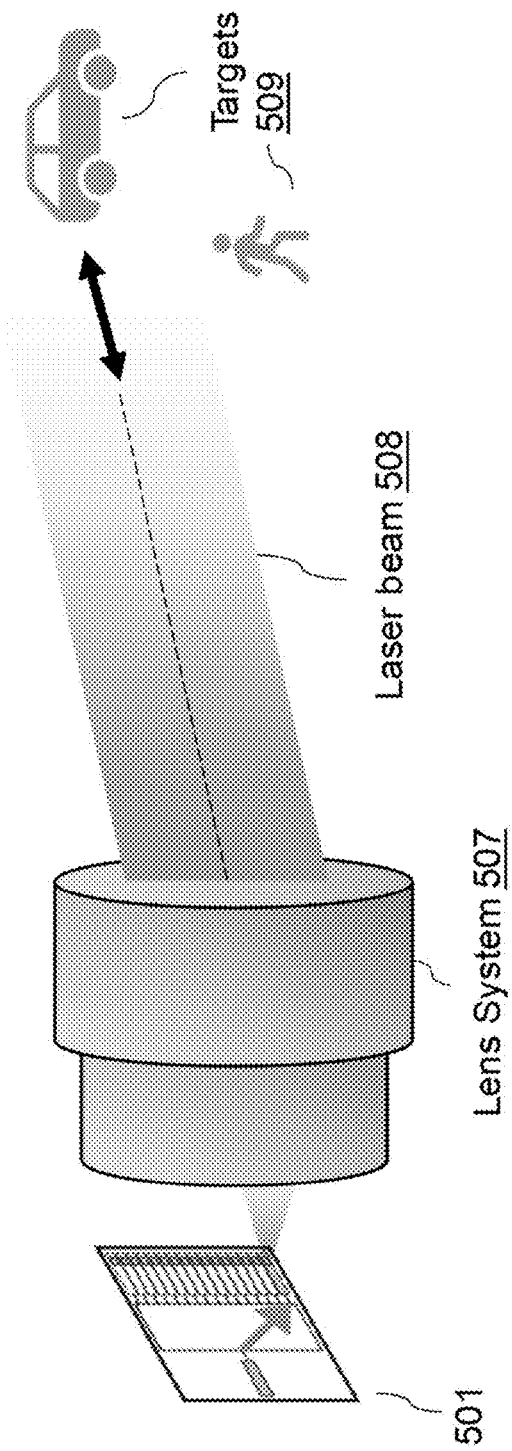
FIG. 5b
FIG. 5c

SWITCHABLE COHERENT PIXEL ARRAY FOR FREQUENCY MODULATED CONTINUOUS WAVE LIGHT DETECTION AND RANGING

CROSS-REFERENCE TO RELATED APPLICATIONS

This application is a continuation of International Application No. PCT/US2020/025042 filed Mar. 26, 2020, which claims the benefit of and priority to six U.S. Provisional applications including U.S. Provisional Application No. 62/940,790 filed Nov. 26, 2019, U.S. Provisional Application No. 62/849,807 filed May 17, 2019, U.S. Provisional Application No. 62/845,149 filed May 8, 2019, U.S. Provisional Application No. 62/845,147 filed May 8, 2019, U.S. Provisional Application No. 62/826,536 filed Mar. 29, 2019, and U.S. Provisional Application No. 62/826,528 filed Mar. 29, 2019. The entire disclosures of International Application No. PCT/US2020/025042, and U.S. Provisional Patent applications 62/940,790, 62/849,807, 62/845,149, 62/845,147, 62/826,536, 62/826,528 are hereby incorporated by reference as if fully set forth herein.

TECHNICAL FIELD

This disclosure relates generally to frequency modulated continuous wave (FMCW) light detection and ranging (LiDAR), more particularly, to a switchable coherent pixel array for FMCW LiDAR.

BACKGROUND INFORMATION

Conventional LiDAR systems use mechanical moving parts to steer the laser beam. And for many applications (e.g., automotive) are too bulky, costly, and unreliable.

BRIEF SUMMARY OF THE INVENTION

A FMCW LiDAR transceiver is implemented on a photonic integrated circuit. The FMCW LiDAR transceiver performs optical beam steering in at least one dimension via a switchable coherent pixel array. In some embodiments, the FMCW LiDAR transceiver is part of a LiDAR chip that includes a plurality of FMCW LiDAR transceivers arranged in an array (e.g., linear array, two dimensional array, etc.). The FMCW LiDAR transceiver and/or the LiDAR chip may be part of a FMCW LiDAR system. The FMCW LiDAR system determines depth information (e.g., range to objects within a field of view of the transceiver, velocity of the objects, etc.) for the field of view of the transceiver.

In some embodiments, the FMCW LiDAR transceiver includes one or more subarrays. A subarray may include an input port, an optical switch, a plurality of splitters, a plurality of mixers, and a plurality of antennas. The input port is configured to receive a frequency modulated laser signal. The optical switch is configured to switchably couple the input port to the optical antennas, thereby forming optical paths between the input port and the optical antennas. For each optical path from the input port to one of the optical antennas, a splitter of the plurality of splitters is coupled along the optical path. Each splitter configured to split a received portion of the laser signal into a local oscillator signal and a transmitted signal. The transmitted signal is emitted via the optical antenna and a reflection of the transmitted signal is received via the optical antenna as a reflected signal. The splitter also outputs a return signal that is a portion of the reflected signal. For each splitter, a mixer of the plurality of mixers is coupled to receive the return signal and the local oscillator signal from the splitter. The mixer is configured to mix the return signal and the local oscillator signal to generate one or more output signals used to determine depth information for a field of view of the transceiver.

In some embodiments, a FMCW LiDAR system includes a LiDAR chip. The LiDAR chip includes a FMCW LiDAR transceiver implemented on a photonic integrated circuit. The photonic integrated circuit includes one or more subarrays. A subarray may include an input port, an optical switch, a plurality of splitters, a plurality of mixers, and a plurality of antennas. The input port is configured to receive a frequency modulated laser signal. The optical switch is configured to switchably couple the input port to the optical antennas, thereby forming optical paths between the input port and the optical antennas. For each optical path from the input port to one of the optical antennas, a splitter of the plurality of splitters is coupled along the optical path. Each splitter configured to split a received portion of the laser signal into a local oscillator signal and a transmitted signal. The transmitted signal is emitted via the optical antenna and a reflection of the transmitted signal is received via the optical antenna as a reflected signal. The splitter also outputs a return signal that is a portion of the reflected signal. For each splitter, a mixer of the plurality of mixers is coupled to receive the return signal and the local oscillator signal from the splitter. The mixer is configured to mix the return signal and the local oscillator signal to generate one or more output signals used to determine depth information for a field of view of the FMCW LiDAR system. The FMCW LiDAR system also includes a lens positioned to collimate the transmitted signals emitted via the plurality of antennas. The lens is also positioned to receive the reflected signals and couple the reflected signals to the emitting optical antennas.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

Embodiments of the disclosure have other advantages and features which will be more readily apparent from the following detailed description and the appended claims, when taken in conjunction with the examples in the accompanying drawings, in which:

FIGS. 4a-c shows examples of an active optical switch of FIGS. 1 and 3a.

FIGS. 5a-c illustrates how a Switchable Coherent Pixel Array steers an optical beam for FMCW LiDAR operation, according to one or more embodiments.

DETAILED DESCRIPTION

Figure 1:
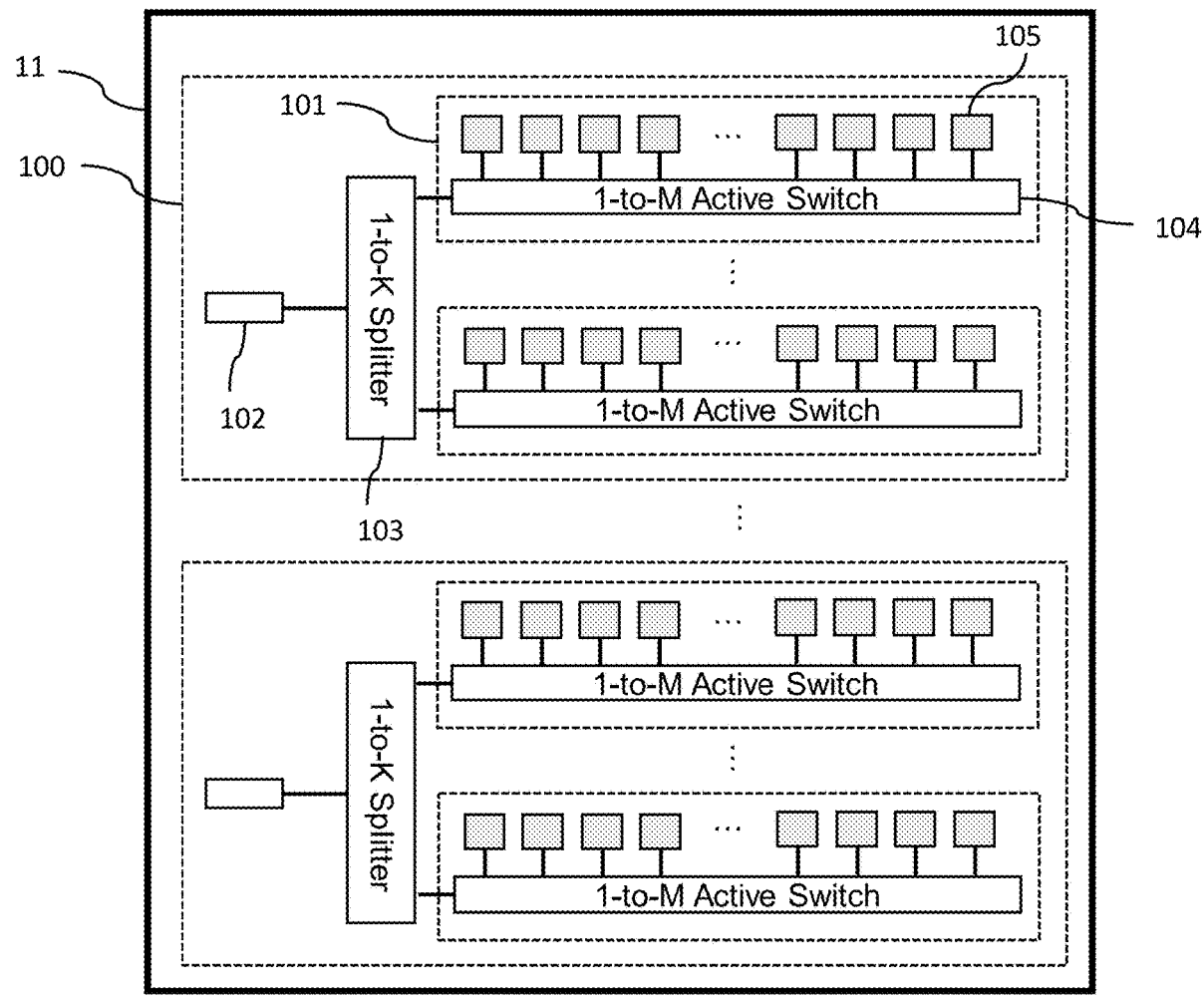
FIG. 1 shows a schematic of a Switchable Coherent Pixel Array FMCW LiDAR chip, according to one or more embodiments.

A FMCW LiDAR system determines depth information (e.g., distance, velocity, acceleration, for one or more objects) for a field of view of the system. The FMCW LiDAR system uses a switchable coherent pixel array (SCPA) on a LiDAR chip (e.g., a photonic integrated circuit). The LiDAR chip may include one or more FMCW transceivers on the LiDAR chip (e.g., each FMCW transceiver could be responsible for a different angular field of view within a field of view of the LiDAR System). The FMCW LiDAR system splits a FMCW beam into a signal portion and a mixing portion. The signal portion is conditioned via a lens assembly and output into a field of view of the FMCW LiDAR system. The signal portion is reflected off of one or more objects in the field of view to form a reflected signal, and the reflections of the signal portion are detected by the FMCW LiDAR system. A portion of the reflected signal is mixed with the mixing portion of the beam to directly measures range and velocity of one or more objects within the field of view of the FMCW LiDAR system.

The FMCW LiDAR system transceiver is implemented on a photonic integrated circuit. The photonic integrated circuit includes one or more basic functional subarrays. Each subarray includes an input port, an optical switch, a plurality of splitters, a plurality of mixers, and a plurality of antennas. The input port is configured to receive a frequency modulated laser signal. The frequency modulated laser signal may be external to the transceiver, or in some cases is on the same chip as the photonic integrated circuit. The optical switch is configured to switchably couple the input port to the optical antennas, thereby forming optical paths between the input port and the optical antennas. In some embodiments, the optical switch optically couples the frequency modulated laser signal to each of the optical antennas one at time over a scanning period of the FMCW transceiver.

For each optical path from the input port to one of the optical antennas, a splitter of the plurality of splitters is coupled along the optical path. Each splitter configured to split a received portion of the laser signal into a local oscillator signal and a transmitted signal. The transmitted signal is emitted via the optical antenna and a reflection of the transmitted signal is received via the optical antenna as a reflected signal. The splitter also outputs a return signal that is a portion of the reflected signal. For each splitter, a mixer of the plurality of mixers is coupled to receive the return signal and the local oscillator signal from the splitter. The mixer is configured to mix the return signal and the local oscillator signal to generate one or more output signals. A frequency of a beat tone resulting from the mixing is proportional to a distance to a surface that reflected the light from the LiDAR system. The one or more output signals are used to determine depth information for the field of view of the LiDAR system. Depth information describes ranges to various surfaces within the field of view of the LiDAR system and may also include information describing velocity of objects within the field of view of the LiDAR system.

Note that the LiDAR chip can steer the light emitted from the LiDAR system in at least one dimension. And in some embodiments, the optical antennas are arranged in two-dimensions such that the LiDAR chip can steer the optical beam two-dimensions. Being able to steer the beam without moving parts may mitigate form factor, cost, and reliability issues found in many conventional mechanically driven LiDAR systems.

FIG. 1 shows a schematic of the Switchable Coherent Pixel Array (SCPA) FMCW LiDAR chip (11), according to one or more embodiments. The LiDAR chip is a photonic integrated circuit. The chip can include a plurality of basic functional subarrays (100). Each subarray (100) includes an optical input/output (I/O) port (102) and an optional 1-to-K optical splitter (103), where K is an integer, and one or more SCPAs (101). The 1-to-K optical splitter (103) may be passive or active. Each of the optical I/Os is fed by a frequency-modulated light source provided by an off-chip or on-chip laser. The optical power can be distributed on-chip through the optional 1-to-K optical splitter to reduce the number of optical I/Os. In the illustrated embodiment, the respective outputs of the 1-to-K optical splitter (103) feeds a corresponding SPCA 101. In the illustrated embodiments, each SCPA 101 includes M coherent pixels (105) and an optical switch network (104), where M is an integer. Note that in some instances one or more of the optical switch networks (104), the optional 1-to-K optical splitter (103), or some combination thereof, may be referred to simply as an optical switch. The optical switch is configured to switchably couple the input port 102 to the optical antennas within the coherent pixels, thereby forming optical paths between the input port and the optical antennas. The optical switch may include a plurality of active optical splitters. In some embodiments, the optical switch optically couples the frequency modulated laser signal to each of the optical antennas one at time over a scanning period of the FMCW transceiver.

The optical switch network (104) selects one or more of the M coherent pixels to send and receive the Frequency Modulated (FM) light for ranging and detection. The coherent pixels can be physically arranged in either one-dimensional (e.g., linear array) or two-dimensional arrays (e.g., rectangular, regular (e.g., non-random arrangement like a grid)) on the chip. In some embodiments, the selected coherent pixel is able to transmit the light into free space, receive the returned optical signals, perform coherent detection and convert optical signals directly into electrical signals for digital signal processing. Note that the received optical signals do not propagate through the switch network again in order to be detected, and instead outputs are separately routed (not shown in the illustrated embodiment), which reduces the loss and therefore improves the signal quality.

Figure 2A:
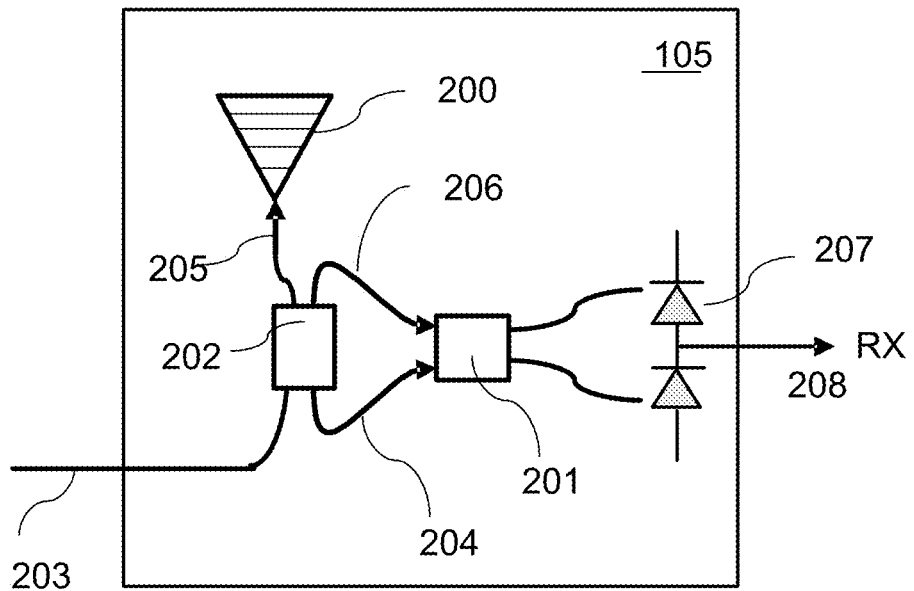
FIGS. 2a-d shows four versions of coherent pixels, according to one or more embodiments.
Figure 2B:
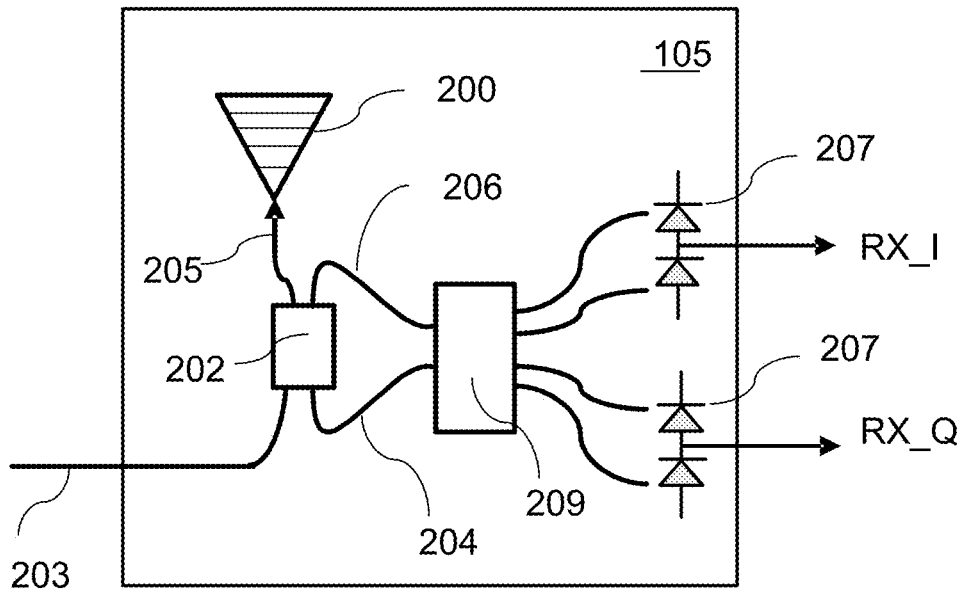

FIGS. 2a-d shows four versions of coherent pixels, according to one or more embodiments. The four versions of coherent pixels may be, e.g., embodiments of the coherent pixels described above in FIG. 1. In FIGS. 2a and 2b, light from the optical switch network (e.g., the optical switch network 104) is provided to an optical input port (203) of the coherent pixel. A bi-directional optical 2×2 splitter (202) splits the light into 2 output ports, referred two as TX Signal (205) and Local Oscillator, LO (206). TX Signal (205) is sent out of the chip using an optical antenna (200). The optical antenna is a device that emits light from on-chip waveguides into free space or couples light from free space into on-chip waveguides, such as a grating coupler, an edge coupler, an integrated reflector or any spot-size converters. The optical antenna is typically polarization-sensitive with much higher emission/coupling efficiency for light with one particular polarization (e.g. TE). The antenna is reciprocal and therefore it collects the reflected beam from the object under measurement and sends it back to the bi-directional 2×2 splitter (202), which in turn splits it between ports 203 and 204. The bi-directional optical 2×2 splitter (202) functions as a "pseudo-circulator" in this monostatic configuration where the transmitter and receiver are collocated. The received signal out of port 204 and LO 206 are mixed for coherent detection by an optical mixer, which can be a balanced 2×2 optical combiner (201) as in FIG. 2a or an optical hybrid (209) as in FIG. 2b. Finally, a pair of Photo-Diodes (PDs) (207) in FIGS. 2a and 4 PDs in FIG. 2b convert the optical signals into electrical signals for beat tone detection. The version in FIG. 2a is referred to as the Balanced Photo-Diode (BPD) version and the one in FIG. 2b as the hybrid version. The hybrid version provides in-phase and quadrature outputs (I/Q), which can be used to resolve velocity-distance ambiguities or enable advanced DSP algorithms in an FMCW LiDAR system. Using bi-directional optical 2×2 splitter as the "pseudo-circulator" may eliminate having a discrete circulator for every single pixel which is impractical for large-scale arrays with hundreds of pixels. Accordingly, the coherent pixels may reduce cost and form factor significantly with a signal-to-noise ratio (SNR) penalty up to 6 dB (as some of the guided optical power cannot be used for coherent detection). For example, the received optical signal may be divided between the port 203 and the port 204, of which the latter is used for coherent detection. The coherent pixel designs, shown in FIG. 2c and FIG. 2d, address this limitation by introducing a polarization splitting antenna 210 into the new structure. Light from the optical switch network is provided to the optical input port (203) of the coherent pixel. An optical splitter (212) splits the light into 2 output ports, referred two as TX Signal (215) and Local Oscillator, LO (214). TX Signal (215) is sent out of the chip directly using a polarization splitting optical antenna (210) with one polarization (e.g. TM). The antenna collects the reflected beam from the object under measurement, couples the orthogonal polarization (e.g. TE) into the waveguide (213) and sends it directly to the optical mixer. In this case, the optical signal received by the antenna is not further divided by any additional splitters or the "pseudo-circulator." The received signal out of port (213) and LO (214) are mixed for coherent detection by an optical mixer, which can be a balanced 2×2 optical combiner (201) as in FIG. 2c or an optical hybrid (209) as in FIG. 2d. Finally, a pair of Photo-Diodes (PDs) (207) in FIGS. 2c and 4 PDs in FIG. 2d convert the optical signals into electrical signals for beat tone detection. This design realizes a highly efficient integrated circulator for every single coherent pixel and enables on-chip monostatic FMCW LiDAR with ultrahigh sensitivity. The details will be further discussed in FIGS. 8 to 10. In some embodiments, in the context of FIG. 1, the coherent pixels of FIGS. 2a-d are such that each of the plurality of optical antennas has a separate splitter, and each splitter is coupled along a respective optical path between the optical switch and the corresponding antenna.

Figure 3A:
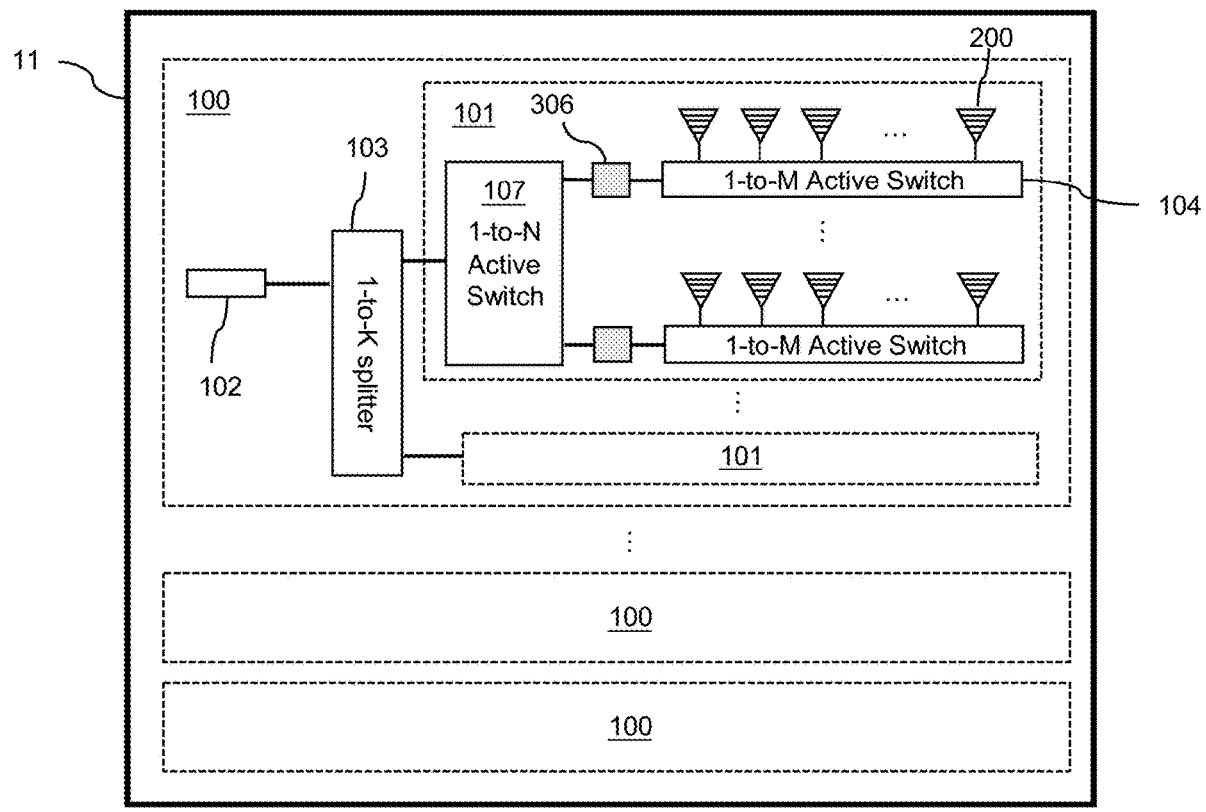
FIGS. 3a-c shows a Switchable Coherent Pixel Array where an optical coherent detection block is shared between multiple coherent pixels, according to one or more embodiments.
Figure 3B:
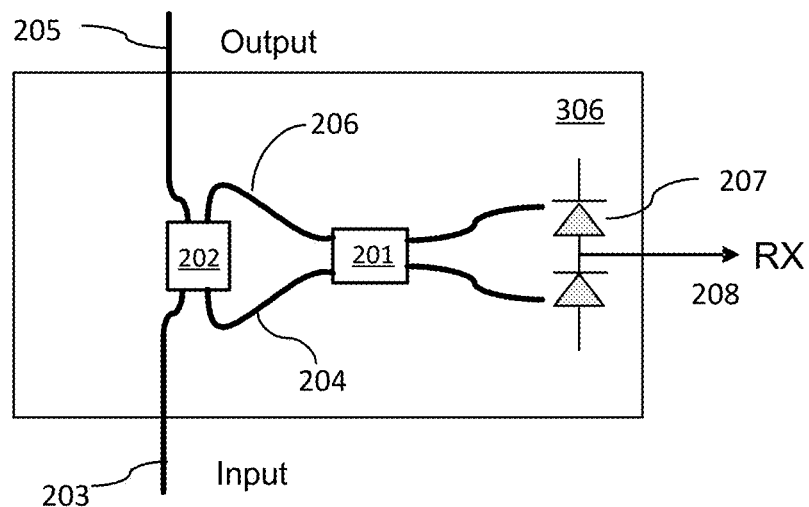
Figure 3C:
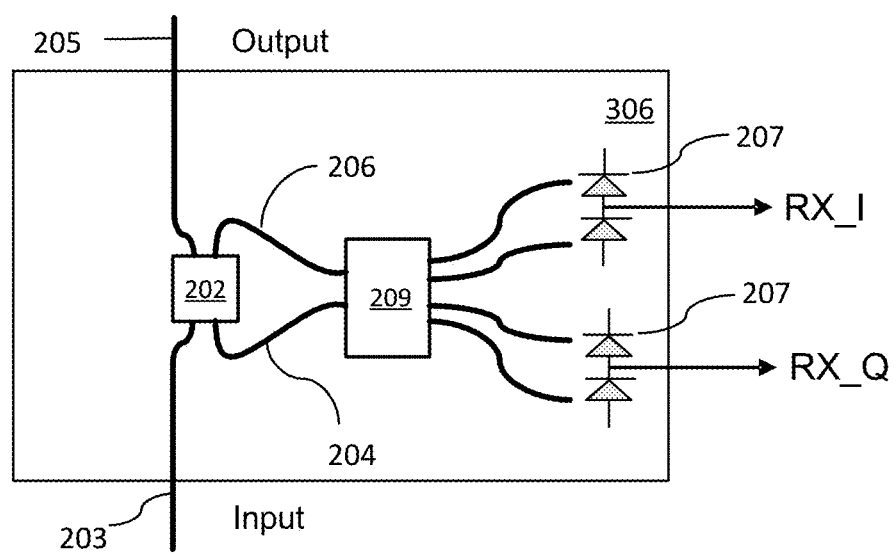

FIGS. 3a-c shows a SCPA where an optical coherent detection block is shared between multiple coherent pixels, according to one or more embodiments. As shown in FIG. 3a, the chip (11) can include a plurality of basic functional subarrays (100). Each subarray (100) includes an optical I/O port (102) and an optional 1-to-K optical splitter (103), and one or more SCPAs (101). Each of the optical I/Os is fed by a frequency-modulated light source provided by an off-chip or on-chip laser. The optical power can be distributed on-chip through the optional 1-to-K optical splitter (103) to reduce the number of optical I/Os. Each of the 1-to-K optical splitters feeds an optional 1-to-N optical switch network (107) that selects 1 out of N rows, where N is an integer. Each row includes a coherent receiver block (306). An optical switch network (104) further selects one out of the M antennas (105), where M is an integer, to send and receive Frequency Modulated (FM) light for ranging and detection. The antennas can be physically arranged in either one-dimensional (e.g., linear array) or two-dimensional arrays on the chip (e.g., rectangular array, regular array, etc.). In this design, the selected antennas transmit the light into free space and receive the returned optical signals passively. The coherent detection function including optical mixing and optical-to-electrical conversion is done in the coherent receiver block (306).

Note that in some instances one or more of the optical switch networks (104), 1-to-N optical switch network (107), or some combination thereof, may be referred to simply as an optical switch. The optical switch is configured to switchably couple the input port 102 to the optical antennas, thereby forming optical paths between the input port and the optical antennas.

Figure 2C:
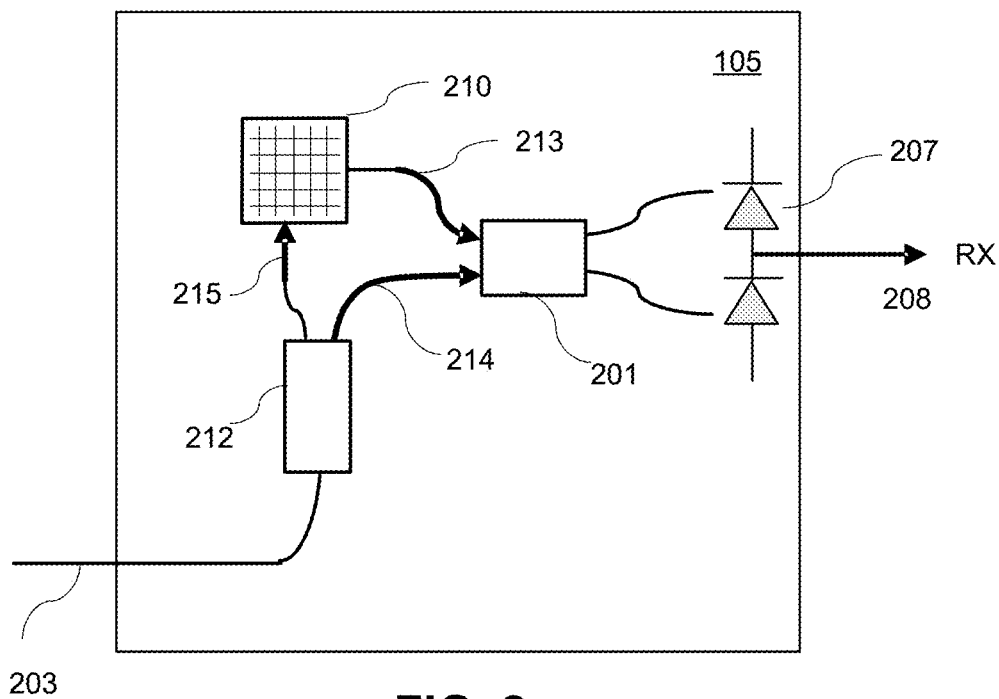
Figure 2D:
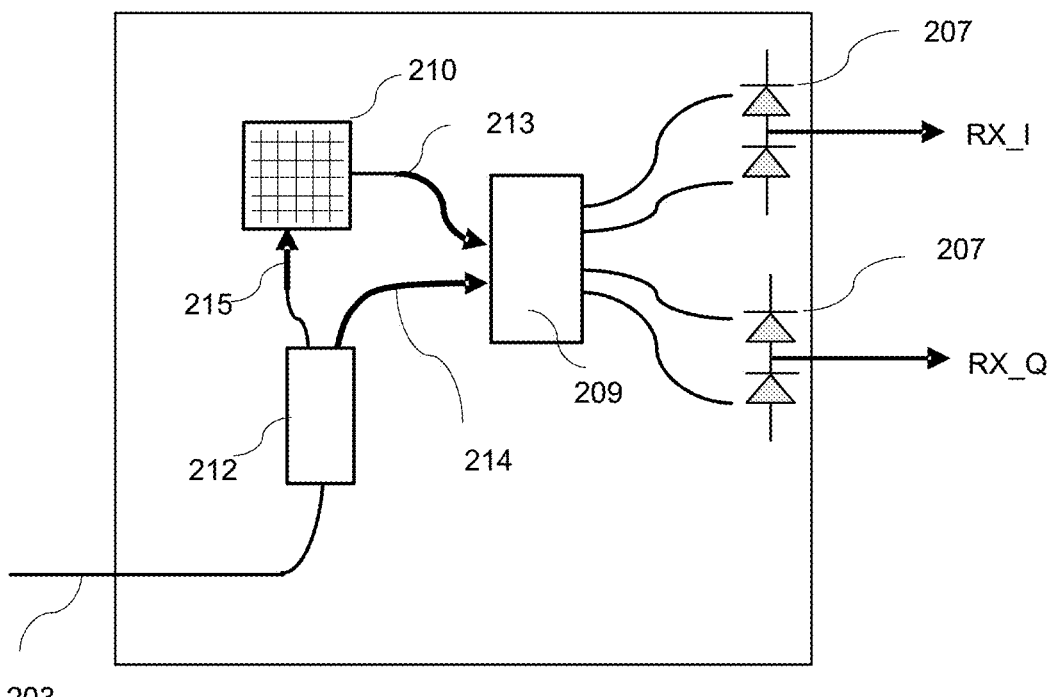

FIGS. 3b and 3c are examples of coherent receiver blocks (e.g., the coherent receiver block (306)), which use the "pseudo-circulator" and behave similar to the coherent pixel blocks in FIGS. 2a and 2c. Different from the scheme in FIG. 1, the received optical signals propagate through the 1-to-M switch network again in order to be detected at the coherent receiver block 306. Compared with SCPA in FIG. 1, this design reduces the number of photodiodes considerably and hence reduces the number of electrical outputs and simplifies electrical routing and/or packaging. Additionally, the pixel size shrinks considerably, allowing smaller pitch between pixels and enabling higher resolution for the FMCW LiDAR.

In some embodiments, in the context of FIG. 3 the coherent receiver blocks of FIGS. 3b and 3c are such that, for each optical switch network (104) there is only one splitter (202) coupled between the input port and the corresponding optical switch network (104).

Figure 4A:
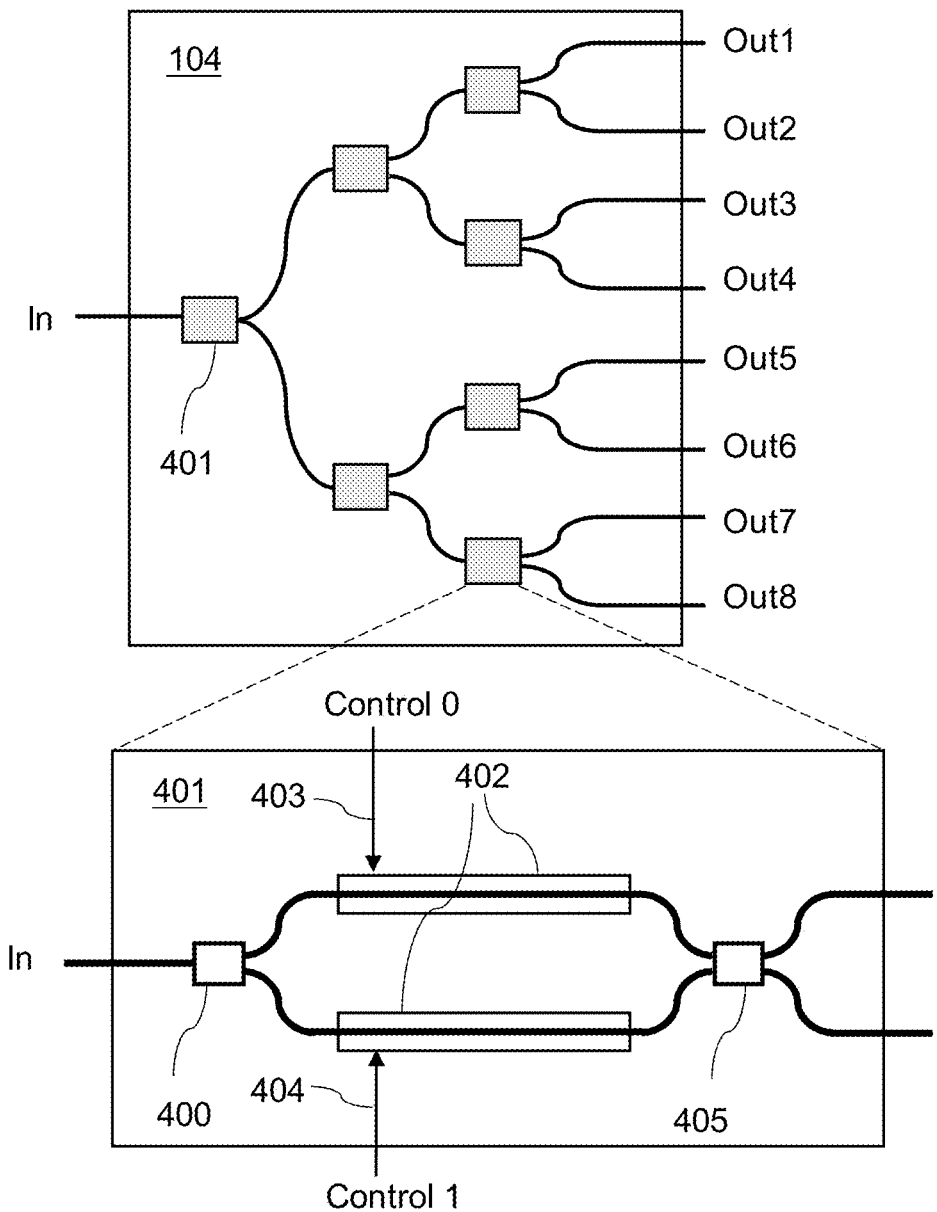
Figure 4B:
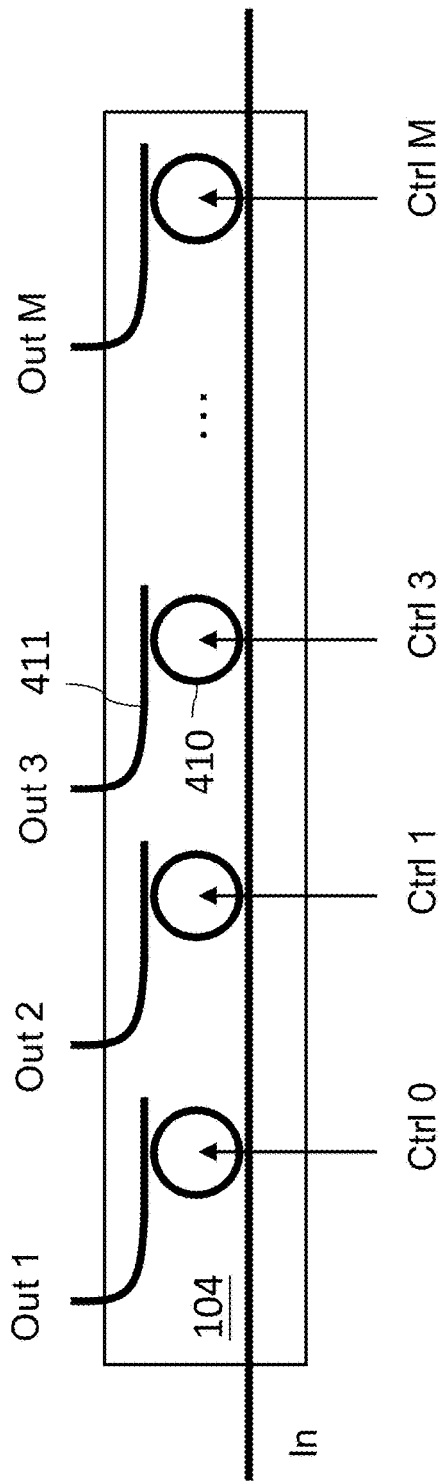
Figure 4C:
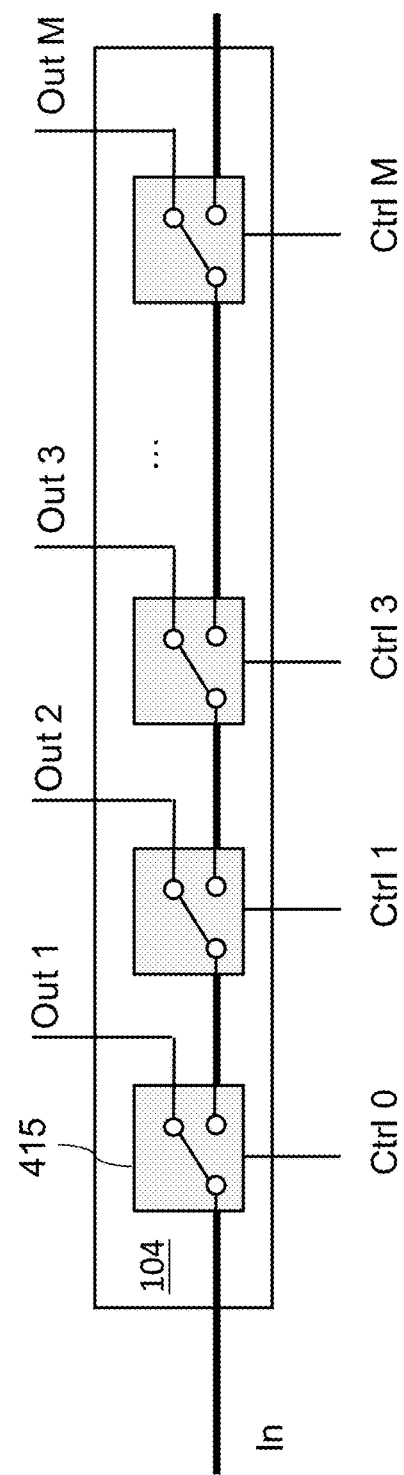

FIGS. 4a-c shows examples of the active optical switch (104) of FIG. 1 and FIG. 3a. A binary tree switch network and its individual switch cell (401) are depicted in FIG. 4a. A 50/50 optical splitter (400) feeds two optical phase shifters (402) which tune a phase of each arm using control signals 403 and 404. The electrical control of the optical switch can be in a push-pull fashion using two controls or it can be single-sided using only one control. The optical signals in the two arms are combined using an optical 2×2 combiner (405). Depending on the control signals, constructive (deconstructive) interference occurs and hence the light is switched between the two outputs. The optical phase shifters (402) can be but not limited to thermo-optic phase shifters or electro-optic phase shifters. As depicted in FIG. 4b, the switch network can also be implemented with an array of Micro Ring Resonators, MRRs (410). The MRR only picks up optical signals from the main bus waveguide when the resonant frequency of the device is aligned with the laser wavelength. Electrical control signals set the resonances of the MRRs in the array and hence select the output port through which the FM Signal is sent and received. Similarly, the switch network can also be implemented with an array of Micro-ElectroMechanical System (MEMS) switches as in FIG. 4c. The MEMS switch is configured to steer the light from the main bus waveguide and therefore selects the output port through which the FM Signal is sent and received.

Figure 5A:
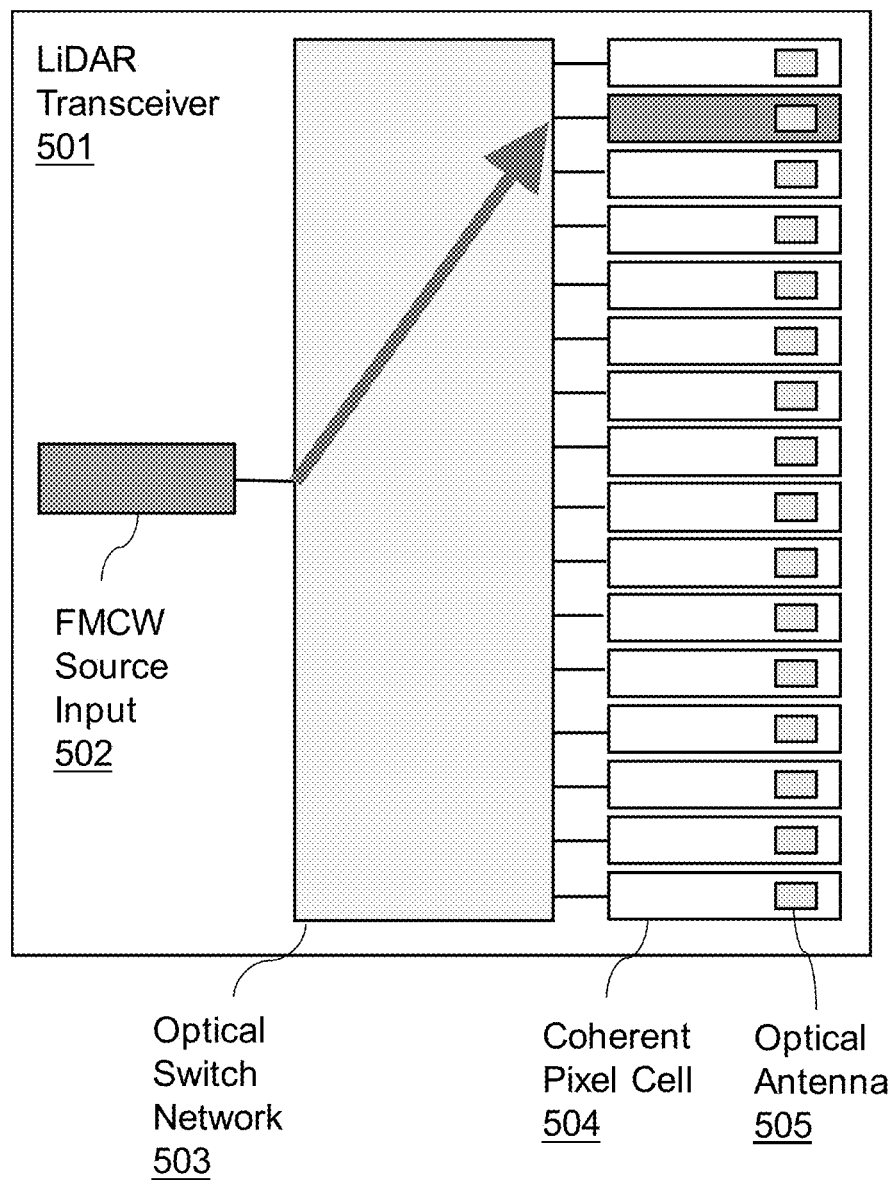

FIGS. 5a-c illustrates how a SCPA steers an optical beam for FMCW LIDAR operation, according to one or more embodiments. In this example, a single SCPA-based LIDAR transceiver (501) is used for illustration. The LiDAR transceiver 501 includes a FMCW light source input (502), an optical switch network (503), coherent pixel cells (504) and one or more optical antennas (505). The LiDAR transceiver (501) may be, e.g., the FMCW LiDAR chip (11) described above with reference to FIGS. 1 and 3a. And a coherent pixel cell 504 may be, e.g., a coherent pixel 105 as described above with regard to FIG. 1. And in some embodiments, the coherent pixel cell 504 may be composed from elements of FIG. 3a (e.g., the coherent receiver 304 one or more optical antennas and corresponding optical paths therebetween).

In the illustrated embodiment, the optical antennas of the LiDAR transceiver 501 are placed at a focal distance of a lens system (507). The lens system (507) includes one or more optical elements (e.g., positive lens, freeform lens, Fresnel lens, etc.) which map a physical location of each coherent pixel, to a unique direction. In some embodiments, the lens system (507) is positioned to collimate the transmitted signals emitted via the plurality of antennas. The lens system (507) is configured to project a transmitted signal emitted from an antenna of the plurality of antennas into a corresponding portion of the field of view of the scanner module, and to provide a reflection of the transmitted signal to the antenna. Each optical antenna sends and receives light from a different angle. Therefore by switching to different antennas, a discrete optical beam scanning is achieved as illustrated in FIG. 5b and FIG. 5c. For the FMCW LIDAR, a laser beam (508) scans across the targets (509) in the field-of-view, and the coherent pixels in the LiDAR transceiver (501) generate electrical signals which are then digitally processed to create LIDAR point clouds. In some embodiments, the lens system (507) produces collimated transmitted signals that scan the transceiver field of view along one angular dimension (e.g., as shown in FIGS. 5b and c).

As shown in FIGS. 5a-c, the coherent pixel cells 504 are arranged in a linear array. However, in other embodiments, the coherent pixel cells 504 may have some other arrangement (e.g., two-dimensional, rectangular, etc.). Note—that in some embodiments a two dimensional arrangement may be used to emit a plurality of transmitted signals from the plurality of antennas, such that the plurality of transmitted signals scan in two dimensions a portion of a field of view of a scanner module (as described below with regard to FIG. 12). For example, scanning in a first dimension and a second dimension, and the scanner module field of view is at 5 degrees or better along the first dimension and is 5 degrees or better along the second dimension.

Figure 6:
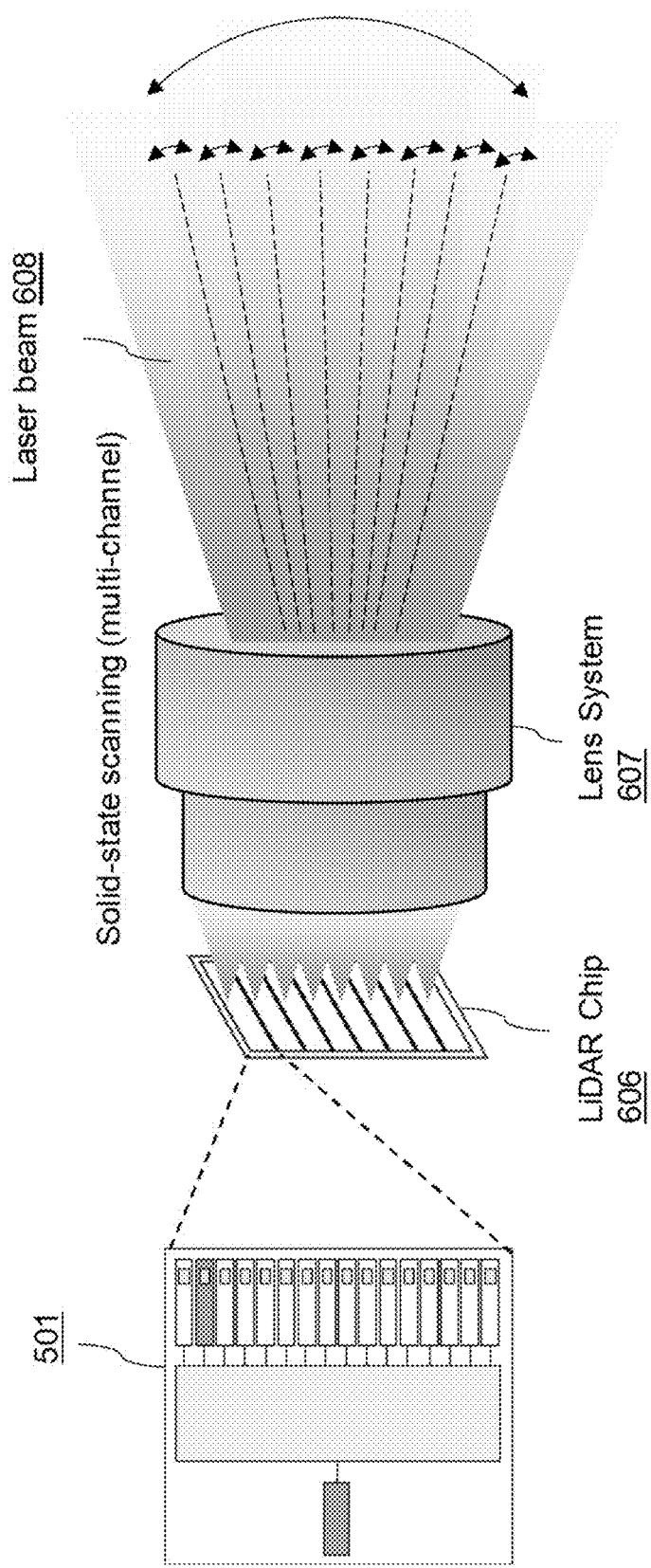
FIG. 6 shows a LiDAR chip with a plurality of parallel FMCW LiDAR transceivers arranged linearly, according to one or more embodiments.

FIG. 6 shows a LIDAR chip (606) with a plurality of parallel FMCW LiDAR transceivers (501) arranged linearly, according to one or more embodiments. As illustrated the LiDAR chip 606 includes 8 FMCW LiDAR transceivers (501) arranged in a linear array. However, in other embodiments, the FMCW LiDAR transceivers (501) may have some other arrangement (e.g., two-dimensional, rectangular, etc.). Each SCPA emits and receives light (608) simultaneously and independently with the assistance of a lens system (607) over a corresponding angular field-of-view (FoV) (depicted in the figure as the small double sided arrow at the end of each dashed line). Each SCPA covers a certain angular FoV and provides a certain pixel rate for a FMCW LiDAR system that includes the LiDAR chip 606. Z parallel FMCW LiDAR transceivers (501) may cover Z times larger angular FoV and provide Z times faster pixel rate, where Z is an integer. Wide FoV and fast pixel rates can be important for high-performance FMCW LiDAR systems.

Figure 7A:
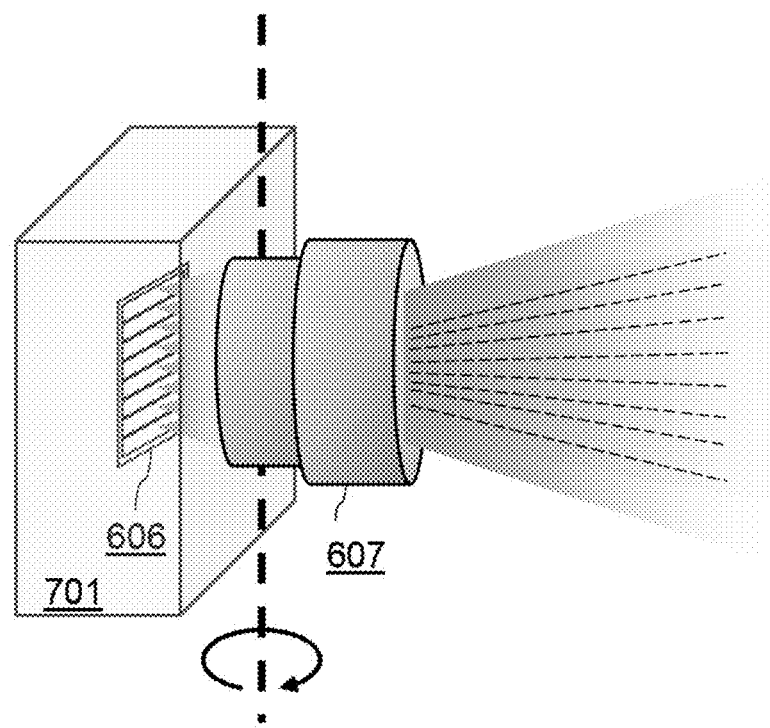
FIGS. 7a-c shows examples of mechanically assisted laser beam scanning in an Switchable Coherent Pixel Array based FMCW LiDAR system, according to one or more embodiments.
Figure 7B:
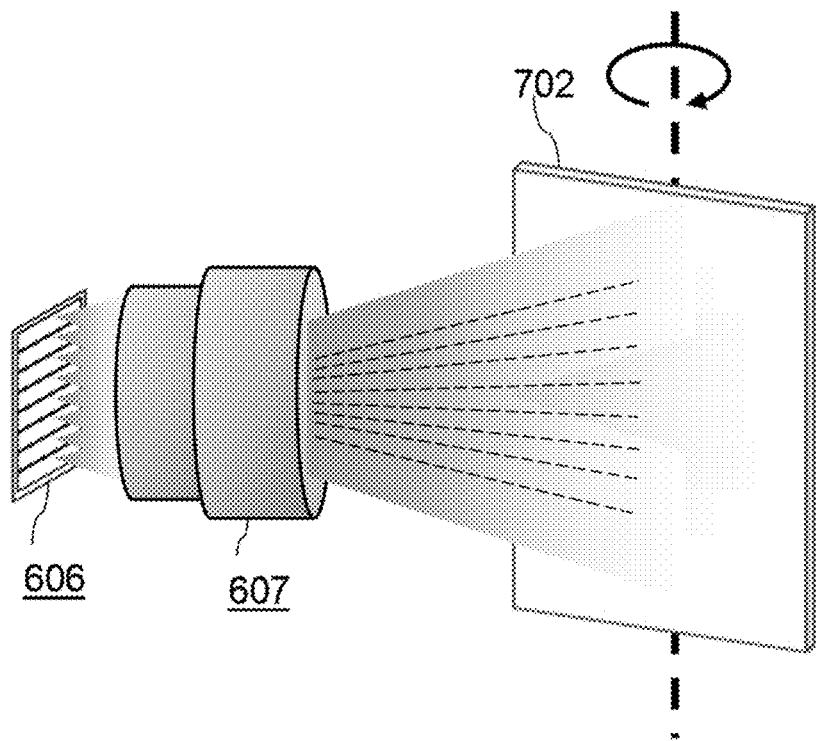
Figure 7C:
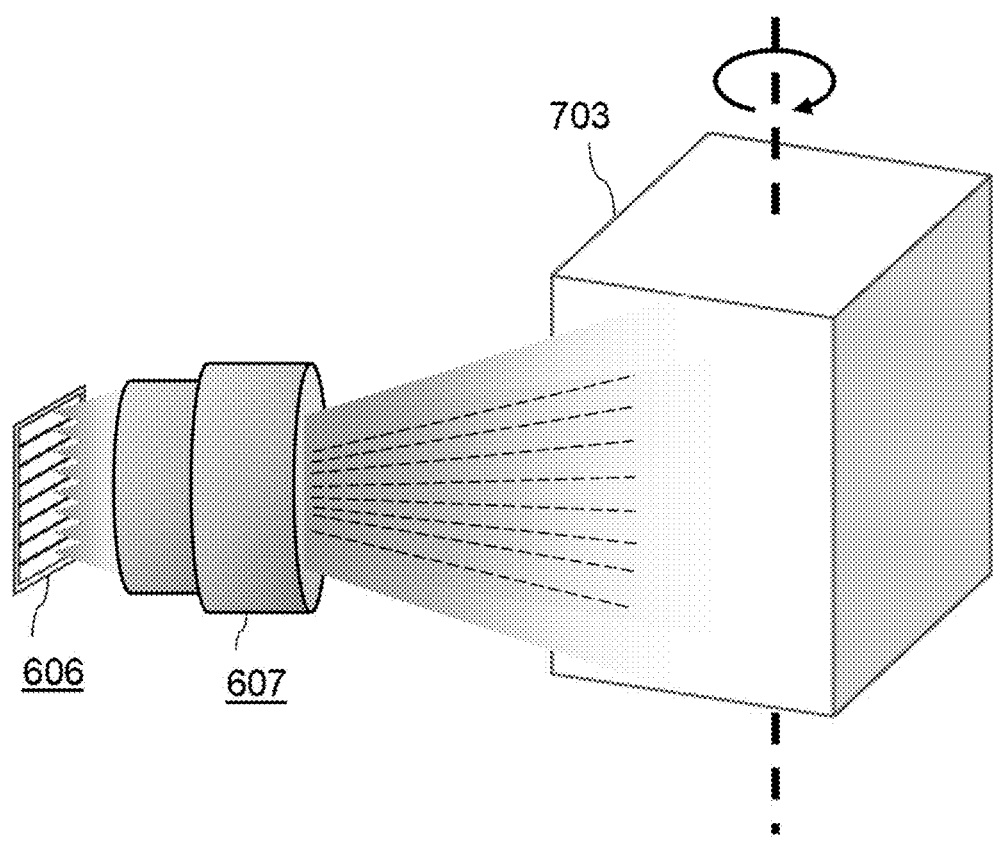

FIGS. 7a-c shows examples of mechanically assisted laser beam scanning in an SCPA-based FMCW LiDAR system, according to one or more embodiments. In FIG. 7a, a photonic chip (606) and a lens system (607) are both mounted on a rotating platform (701). The photonic chip 606 may be an embodiment of the LiDAR chip 606, the LiDAR transceiver 501, or some combination thereof. In the illustrated embodiment, the photonic chip (606) can achieve solid-state scanning in a first dimension (e.g., vertically), and the rotating platform (701) can achieve 360 degrees in an orthogonal second dimension (e.g., horizontally). In FIG. 7b, the photonic chip (606) and lens system (607) is stationary and the laser beams are steered by a moving mirror (702) (e.g. a galvo mirror). In FIG. 7c, the photonic chip (606) and lens system (607) are stationary and the laser beams are steered by a rotating a polygon mirror (703). The moving mirror (702) and/or the polygon mirror (703) may generally be referred to as a scanning mirror. And the scanning mirror is configured to scan the beams (transmitted signals) in a second dimension within a field of view of a scanner module (as described below with regard to FIG. 12), the second dimension orthogonal to the one angular dimension.

Although the photonic chip 606 can achieve all-solid-state beam steering, and in some cases it could be in two-dimensions (e.g., optical antennas arranged in 2-dimensional array), the overall field-of-view and addressable positions of FMCW LiDAR can be greatly improved with the assistance of a mechanical device as illustrated in the examples.

Figure 8:
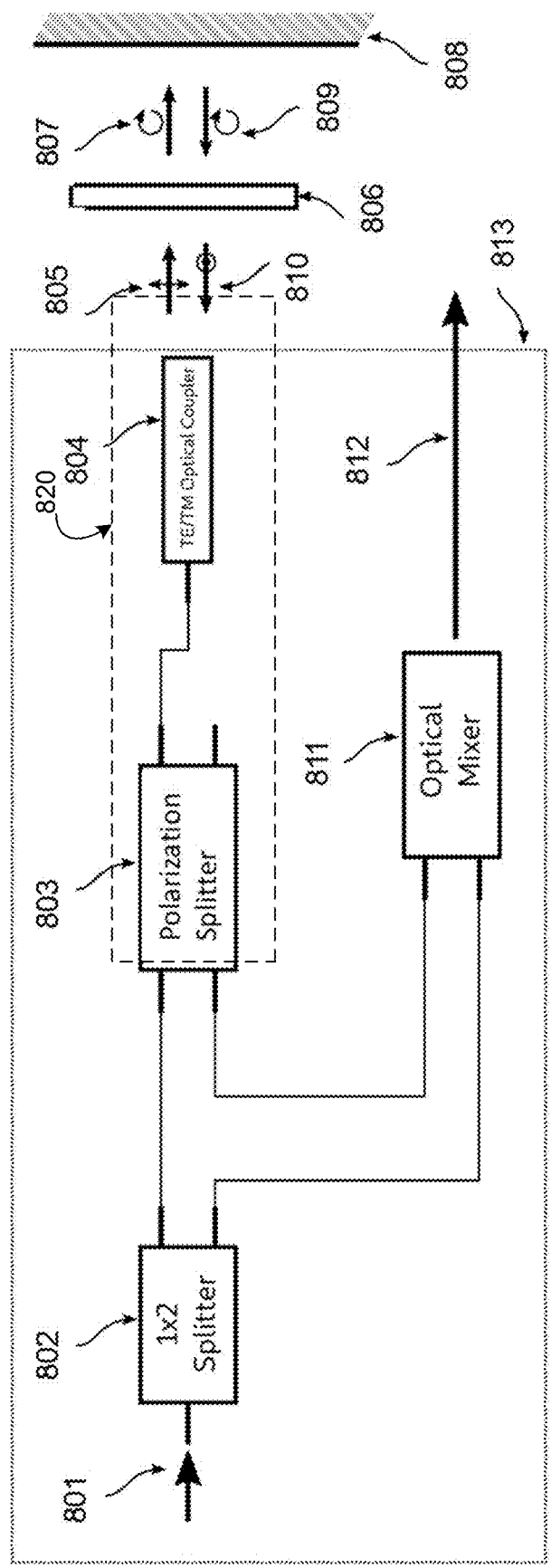
FIG. 8 shows a diagram of a first embodiment of a coherent pixel which utilizes two polarizations of light to improve performance of a FMCW LiDAR system, according to one or more embodiments.

FIG. 8 shows a diagram of a first embodiment of a coherent pixel (813) which utilizes two polarizations of light to improve performance of a FMCW LiDAR system, according to one or more embodiments. Input light (801) originating from a laser enters the coherent pixel and is split by an X/(1−X) splitter (802), also referred to as a splitter (802). X % of the light leaves the top port of the splitter, which constitutes the TX signal, and (1−X) % of the light leaves the bottom port of the splitter, which constitutes the local oscillator (LO) signal. Depending on the system parameters, an optimal splitting ratio may be chosen. The TX signal enters a polarization assembly 820. In the illustrated embodiment, the polarization assembly 820 includes a polarization splitter (803) and a polarization-insensitive free-space coupler (804). However, in other embodiments, e.g., as discussed below with regard to FIG. 9, the polarization splitter (803) and a polarization-insensitive free-space coupler (804) may be replaced with a single polarization-splitting vertical chip-to-free-space coupler. The polarization splitter (803), also referred to as a polarizer, which separates transverse electric (TE) and transverse magnetic (TM) polarized light. As an example, the input light in FIG. 1 may be TE-polarized. TM-polarized light can be used without modification of this idea. Because the TX signal light is TE polarized, the light is coupled to a top port on the right-hand side of the polarization splitter (803). Light that is TM polarized leaves through a bottom port on the right-hand side of the polarization splitter (803). The TX signal leaving the polarization splitter (803) enters a polarization-insensitive free-space coupler (804) which generates a free-space beam of light (805) that has a linear polarization matching the TE field of the preceding optical circuit (813). The polarization-insensitive free-space coupler (804) is an example of an optical antenna. For example, the polarization-insensitive free-space coupler could be a vertical grating, an edge coupler (e.g. inversely tapered waveguide) or an angled reflector. The free-space beam (805) propagates through a quarter-wave plate (806) which converts the linearly polarized beam of light to a circularly polarized beam of light (807) The now-circularly-polarized light (807) propagates over a distance, which delays the light relative to the LO signal. This beam reflects off of a target surface (808), producing a reflected beam of light (809). Depending on the surface properties, this reflected beam may maintain its circular polarization or its polarization become randomized. The reflected beam of light (809) propagates back through free-space and a second time through the quarter waveplate (806). If the reflected beam (809) maintained its circular polarization, then the transmitted beam (810) will have a TM polarization (with respect to the originating transmitting and receiving optical circuit (813)). If the reflected beam (809) has a randomized polarization, then the transmitted beam (810) will have a random polarization. The transmitted beam (810) is coupled back into the coherent pixel (813) and propagates back into the top right-hand port of the polarization splitter (803). If the received beam of light is TM polarized, all of the light will be coupled to the bottom-left port of the polarization splitter (803). If the received beam is randomly polarized, then nominally half of the optical power will be coupled to the bottom-left port. Light coupled to the bottom-left port of (803) enters the two-input-power optical mixer (811) which mixes the delayed received signal with the LO signal. The optical mixer generates one or more electrical signals (812) which are interpreted by the FMCW system. Removing the quarter-wave plate only affects the system performance for polarization-maintaining target surfaces and does not affect the basic principle of this idea.

The polarization assembly (820) may be configured to, e.g., couple an optical signal from a first waveguide (e.g., from (802)) to form the transmitted signal; polarize the transmitted signal to have a first polarization; polarize the reflected signal (incoupled via (804)) based on a second polarization that is orthogonal to the first polarization to form a return signal; and couple the return signal into a second waveguide (e.g., going toward (811)) for optical detection.

The coherent pixel (813) may be, e.g., the coherent pixel 105. The coherent pixel (813) may also be an embodiment of the coherent pixel described above with reference to FIG. 2a. Similarly, the coherent pixel (813) may also be an embodiment of the coherent pixel described above with reference to FIG. 2b. For example, the bi-directional optical 2×2 splitter (202) may be replaced with the X/(1−X) splitter (802) and the polarization splitter (803), and the optical antenna 200 would be replaced with the polarization-insensitive free-space coupler (804). And in the context of, e.g., a LIDAR transceiver, for each X/(1−X) splitter, a polarizer splitter is coupled along the optical path between the splitter and an optical antenna. And the polarization splitter is configured to: polarize the transmitted signal to have a first polarization (e.g., TE); and polarize the reflected signal to form the return signal such that the return signal has a second polarization (e.g., TM) that is orthogonal to the first polarization.

Figure 9:
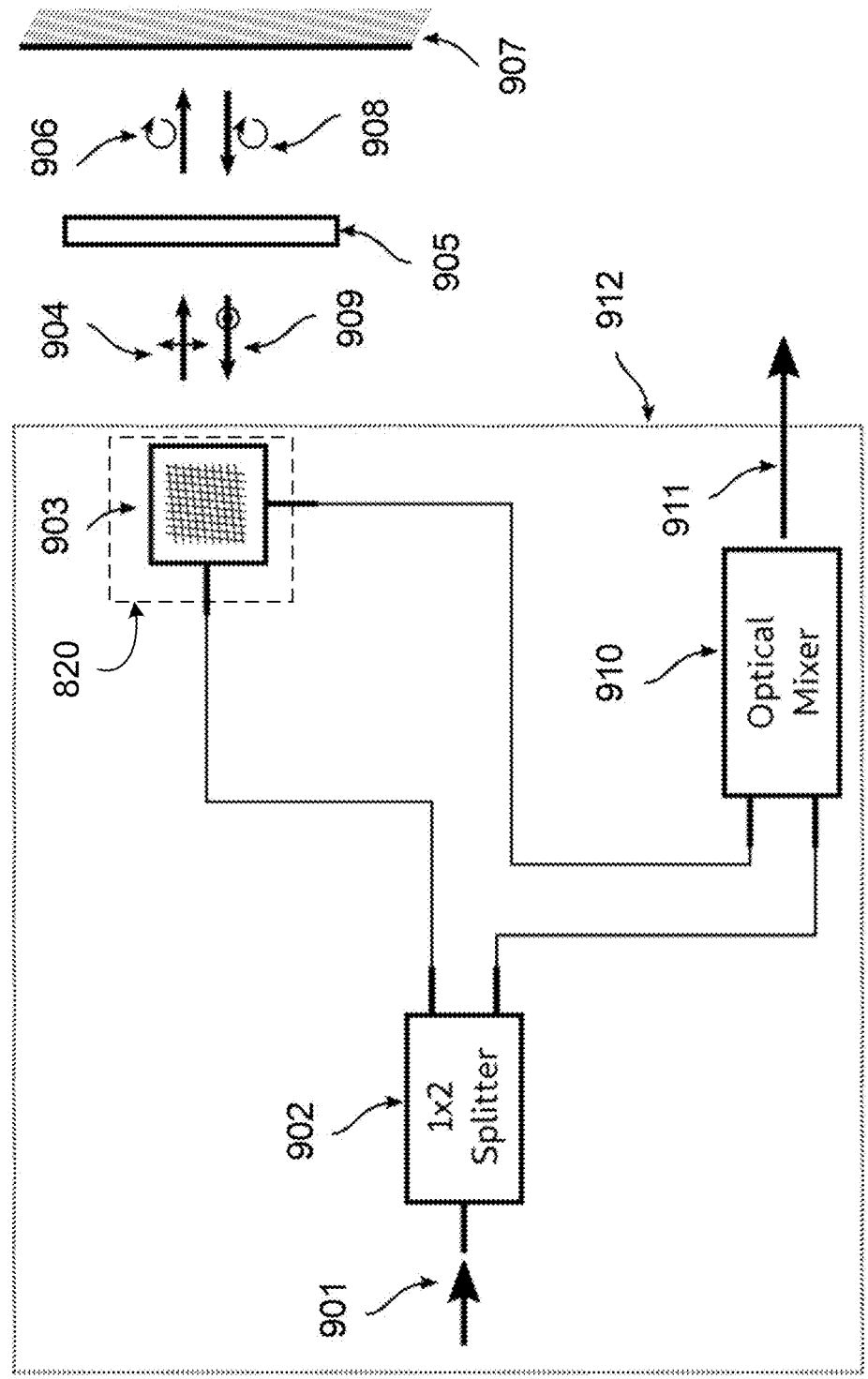
FIG. 9 shows a diagram of a second embodiment of a coherent pixel which utilizes two polarizations of light to improve performance of a FMCW LiDAR system, according to one or more embodiments.

FIG. 9 shows a diagram of a second embodiment of a coherent pixel (912) which utilizes two polarizations of light to improve performance of a FMCW LiDAR system, according to one or more embodiments. The second embodiment is substantially similar to the first embodiments, except that the polarization splitter (803) and free-space coupler (804) within the polarization assembly 820 in FIG. 8 are replaced by a single polarization-splitting vertical chip-to-free-space coupler (903) as illustrated in FIG. 9. This free-space coupler takes TE light from its left input and generates a free space beam (904) with TE polarization. TM light incident on the coupler, meanwhile, is coupled into the bottom port of the optical device, which is connected to the optical mixer (910). The functionality and/or structure of the rest of the system in this second embodiment, labeled (901), (902), (904), (905), (906), (907), (908), (909), (910), and (911) is substantially the same as (801), (802), (805), (806), (807), (808), (809), (810), (811), and (812).

Note in FIG. 9, the functionality of the polarization (820) and the polarization-splitting vertical chip-to-free-space coupler (903) are the same. The polarization assembly (820) may be configured to, e.g., couple an optical signal from a first waveguide (e.g., from (902)) to form the transmitted signal; polarize the transmitted signal to have a first polarization; polarize the reflected signal (incoupled via (903)) based on a second polarization that is orthogonal to the first polarization to form a return signal; and couple the return signal into a second waveguide (e.g., going toward (910)) for optical detection.

The coherent pixel (912) may be, e.g., the coherent pixel 105. The coherent pixel (912) may also be an embodiment of the coherent pixel described above with reference to FIG. 2c. Similarly, the coherent pixel (912) may also be an embodiment of the coherent pixel described above with reference to FIG. 2d. For example, the optical splitter (212) may be replaced with the X/(1−X) splitter (902), and the polarization splitting antenna (210) would be replaced with the single polarization-splitting vertical chip-to-free-space coupler (903).

Figure 10:
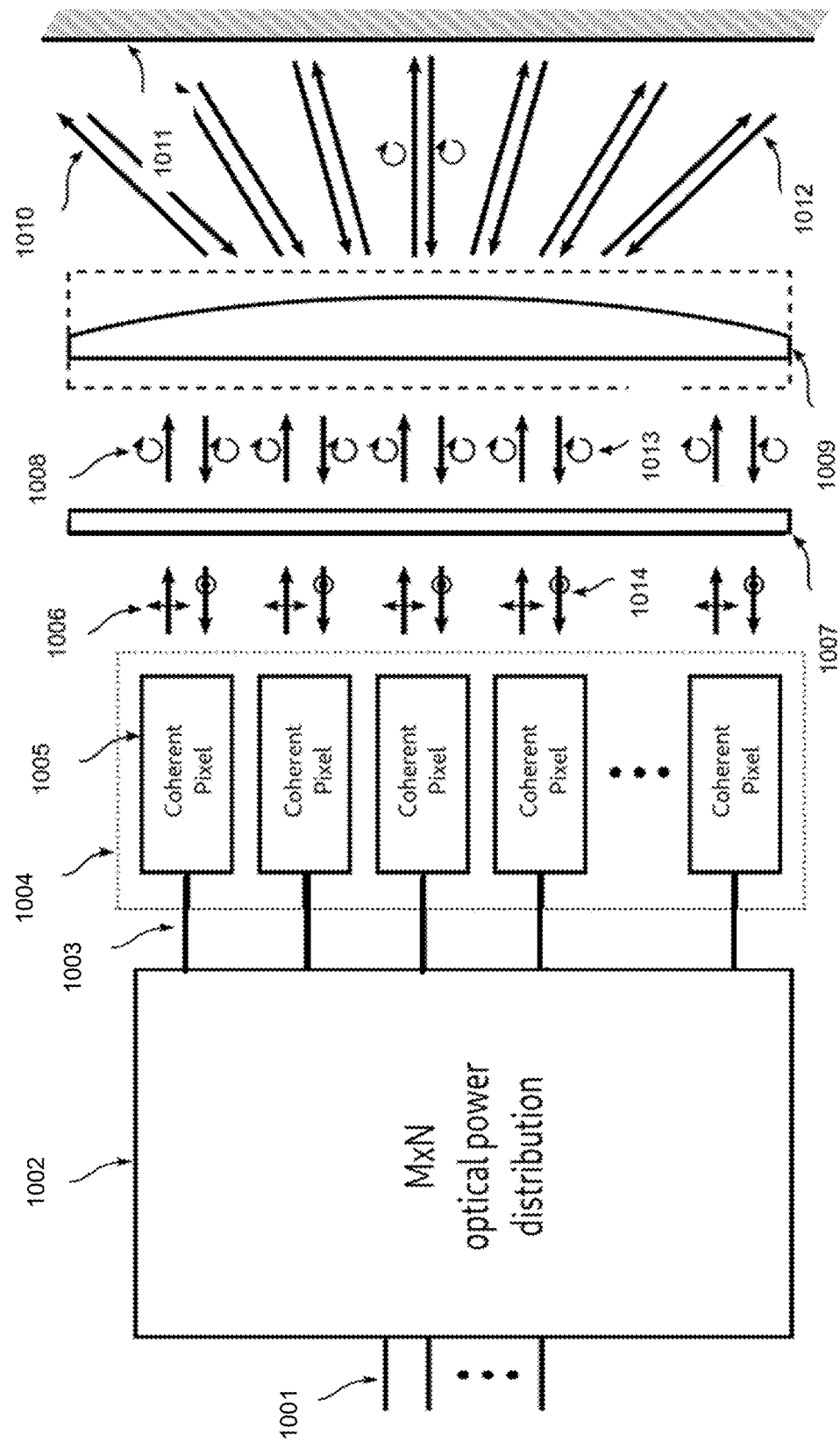
FIG. 10 shows how coherent pixels may be used in a focal plane array for FMCW applications, according to one or more embodiments.

FIG. 10 shows how coherent pixels may be used in a focal plane array (FPA) for FMCW applications, according to one or more embodiments. A coherent pixel in FIG. 10 may be, e.g., the coherent pixel 813 and/or the coherent pixel 912. The FPA employs coherent pixels to form a beam steering apparatus. In FIG. 10, light entering M input waveguides (1001) is split between N output waveguides (1003) by an M×N splitter (1002), where M and N are integers. The N output waveguides are connected to an array of coherent pixels (1004). This array can be one dimensional or two dimensional depending on if one dimensional or two-dimensional beam steering is desired. Each coherent pixel (1005) emits TE-polarized light (1006) that propagates through a quarter-wave plate (1007) which converts the light to circular polarization (1008). The circularly polarized light passes through a lens (1009) which may consist of one or more lens elements. This lens converts the spatially-distributed circularly polarized beams of light to angled circularly polarized beams of light (1010). The output angle of the lens depends on the position of the input beam (e.g., determined in part on a location of the coherent pixel (1005) that emitted the beam) and the lens (1009), enabling beam steering operation. The angled beams reflect off of a target (1011). The diffuse reflected light returns towards the lens at the same angle (1012). This reflected light may retain its circular polarization or become randomly polarized depending on the properties of the target. The reflected beam of light passes back through the lens (1009) which maps the angle of the beam to a specific position on the FPA. The transmitted beam (1013) passes back through the quarter-wave plate (1007). If the reflected light maintains its circular polarization, then the transmitted light (1014) will be TM-polarized. If the reflected light is randomly polarized, then the transmitted light (1014) will have a random polarization. The transmitted light (1014) passes is coupled back into the array of coherent pixels (1004), which converts the light into an electrical signal as described previously.

Figure 11A:
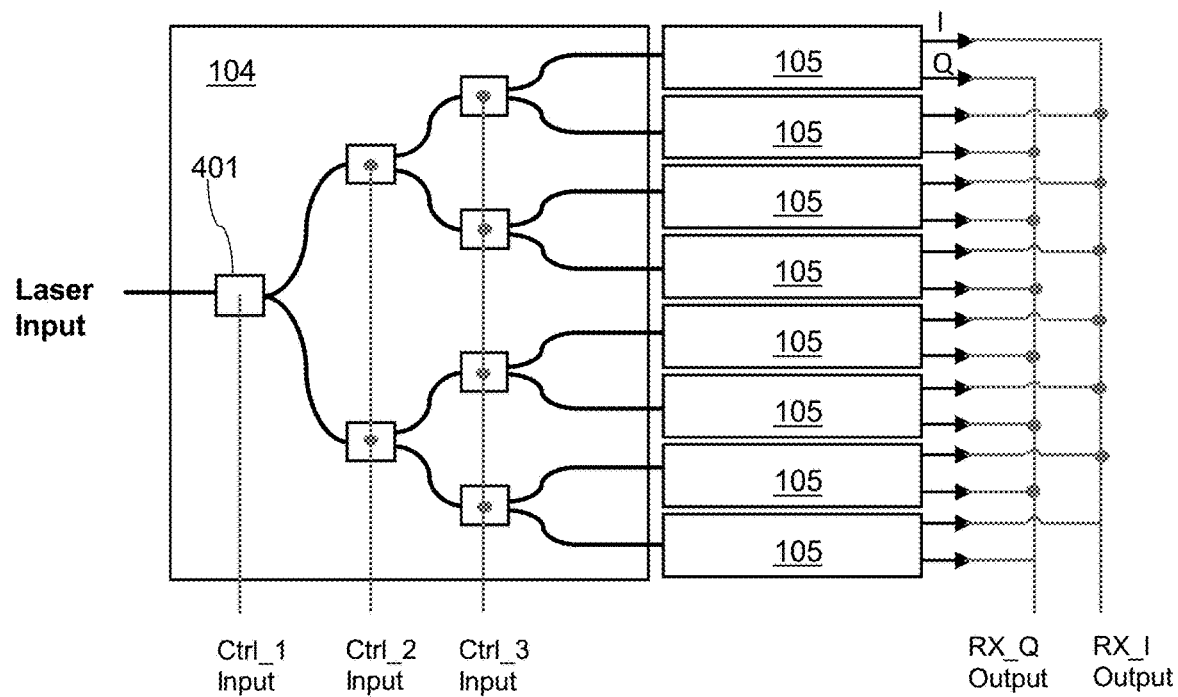
FIGS. 11a-d illustrates electrical wiring schemes for Switchable Coherent Pixel Arrays, according to one or more embodiments.
Figure 11B:
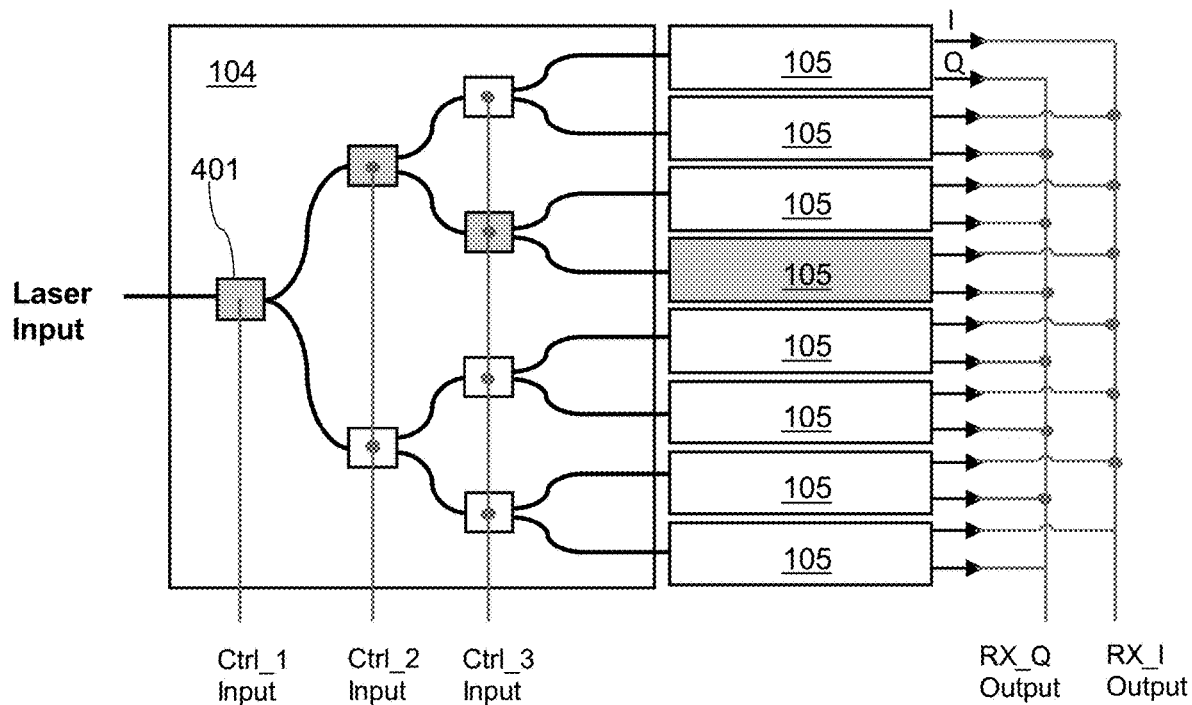
Figure 11C:
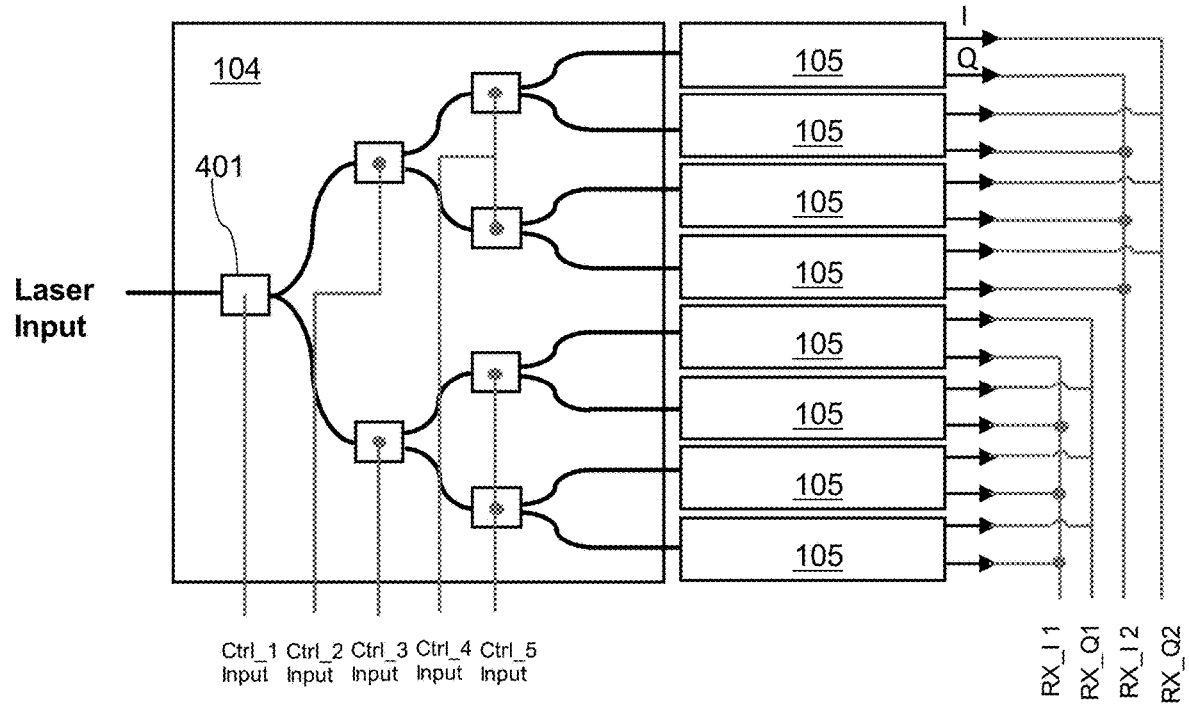
Figure 11D:
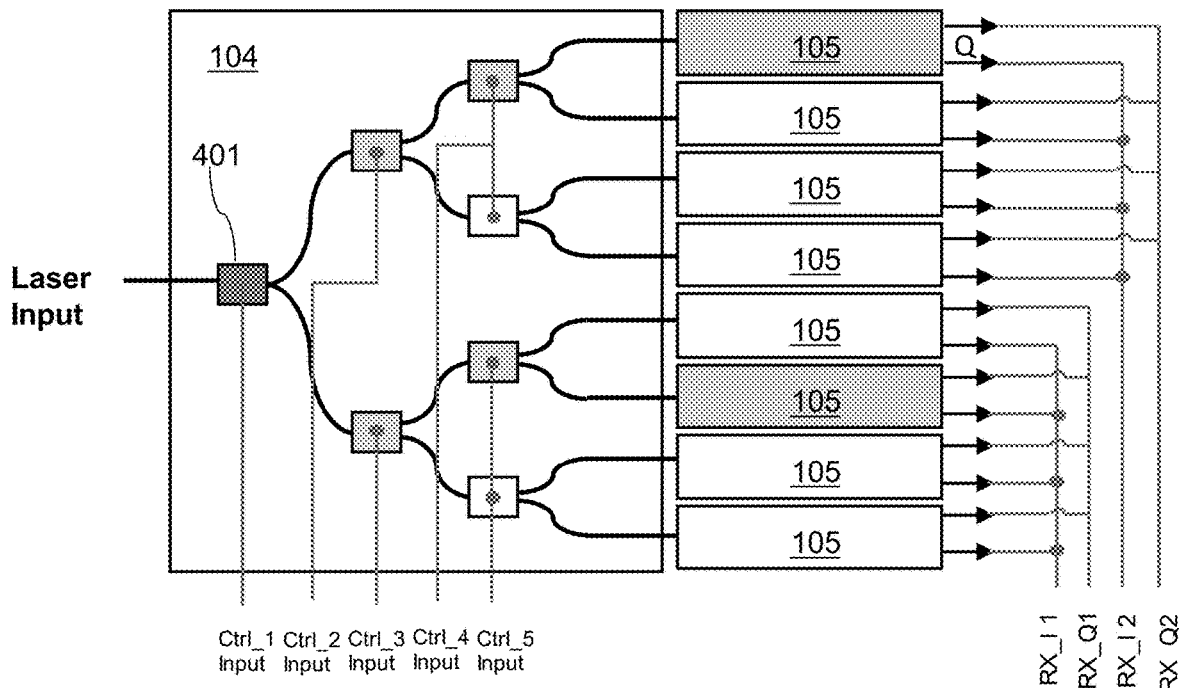

FIGS. 11a-d illustrates electrical wiring schemes for SCPAs, according to one or more embodiments. The electrical wiring schemes may reduce a number of electrical I/Os significantly for a photonic chip of a LiDAR transceiver. Scheme 1 is illustrated in FIG. 11a and FIG. 11b. Scheme 2 is illustrated in FIG. 11c and FIG. 11d. In this example, a 1-to-8 3-stage binary tree switch network is shown where each switch has one electrical control signal and a coherent pixel array where each coherent pixel has two electrical outputs (e.g. I/Q signals). In Scheme 1, switches in a same stage are electrically connected together. With only three switch control signals, a LiDAR system can switch between any of the eight coherent pixels. All the I output signals from the coherent pixels are connected together as one shared output (RX_I) and all the Q output signals as another shared output (RX_Q). When only one coherent pixel is activated by the switch network, the remaining coherent pixels receive little light as their transmitter signals or their LO signals. Therefore, shared outputs represent correct signals from the activated pixel with little crosstalk from adjacent pixels. In this example, Scheme 1 reduces the number of I/O signals to a minimum of five for a total 7 switch inputs and 16 coherent pixel outputs. The reduction in electrical I/Os becomes even more significant as the scale of the SCPA increases and/or the number of parallel SCPA increases. In Scheme 2, more than one coherent pixel can be selected to transmit and receive light simultaneously. In FIG. 11c, the switch control signals and coherent pixel output signals are split between the top and bottom half the 1-to-8 binary switch network, yielding 5 switch controls and 4 receiver outputs. During operation, the first switch is controlled to have 50/50 splitting ratio at the two outputs, delivering even optical power into the top and bottom half of the 1-to-8 switch tree. With the independent control and readout capability for the top and bottom half of the tree, one pixel from the top half and one pixel from the bottom half can be activated simultaneously. Scheme 2 can be adapted to Scheme 1 by operating the first switch stage in the normal binary mode and it can also arbitrarily control the splitting ratio of the first switch stage, providing a more flexible and potentially software defined beam scanning option at some hardware cost.

Figure 12:
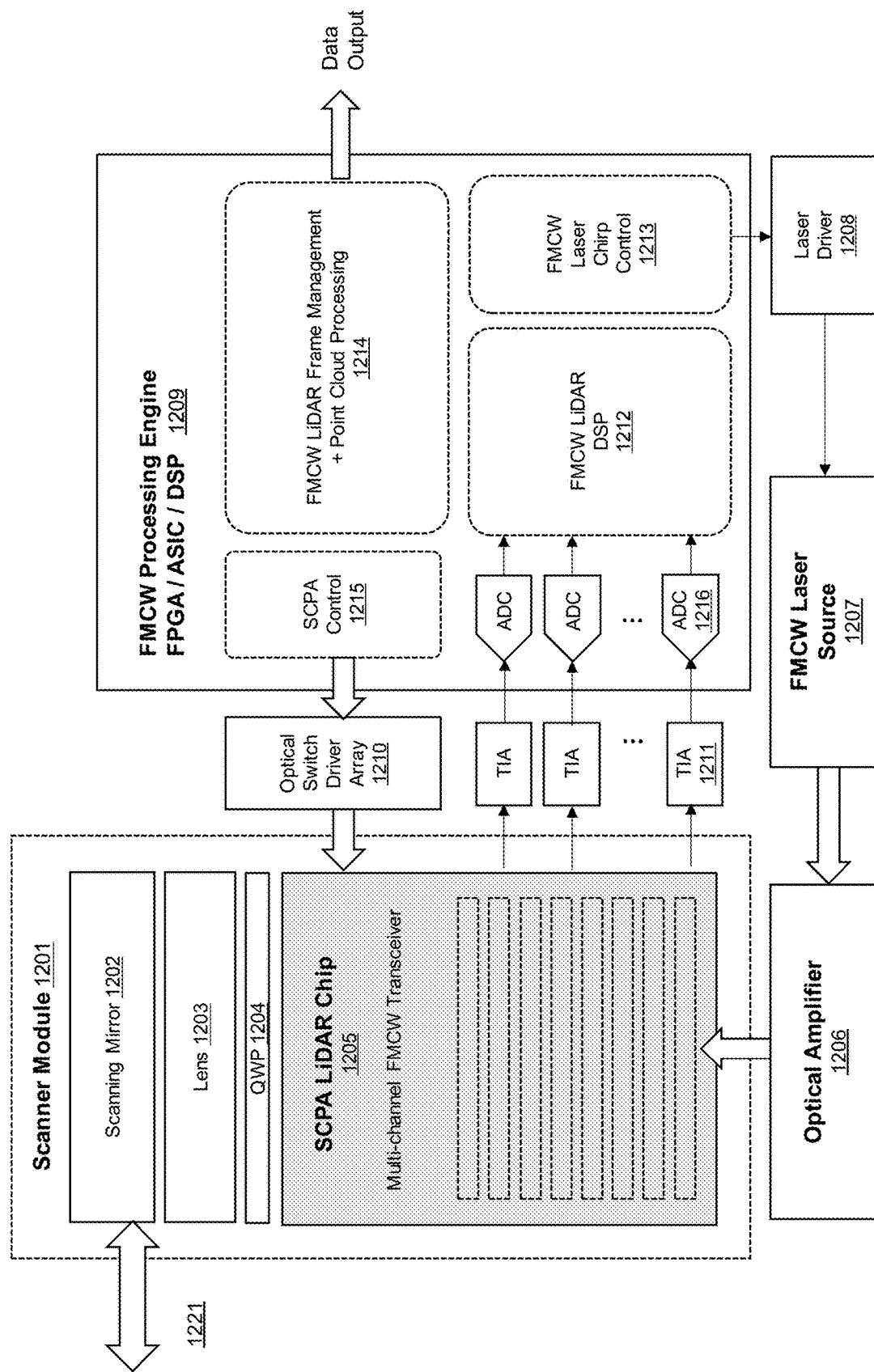
FIG. 12 shows a system diagram of a Switchable Coherent Pixel Array-based FMCW LiDAR system, according to one or more embodiments.

FIG. 12 shows a system diagram of a SCPA-based FMCW LiDAR system, according to one or more embodiments. A scanner module (1201) includes the SCPA LiDAR chip (1205) with a single or a plurality of FMCW transceiver channels and a lens system (1203) that includes one or more optical elements. In some embodiments, the lens system (1203) is an embodiment of the lens system (507).

The SCPA LiDAR chip (1205) includes one or more frequency modulated continuous wave (FMCW) LiDAR transceivers that are implemented as one or more photonic integrated circuits. A photonic integrated circuit for a transceiver may comprise an input port, a plurality of optical antennas, an optical switch, a plurality of splitters, and a plurality of mixers.

The input port is configured to receive a frequency modulated laser signal. The optical switch is configured to switchably couple the input port to the optical antennas, thereby forming optical paths between the input port and the optical antennas. For each optical path from the input port to one of the optical antennas, a splitter coupled along the optical path and configured to: split a received portion of the laser signal into a local oscillator signal and a transmitted signal, wherein the transmitted signal is emitted via the optical antenna and a reflection of the transmitted signal is received via the optical antenna as a reflected signal; and output a return signal that is a portion of the reflected signal. For each splitter, a mixer coupled to receive the return signal and the local oscillator signal from the splitter, the mixer configured to mix the return signal and the local oscillator signal to generate one or more output signals used to determine depth information for a field of view of the LiDAR system (also referred to as the field of view of the scanner module (1201).

In some embodiments, the lens system (1203) produces collimated transmitted signals that scan the scanner module (1201) field of view along one or more angular dimension (e.g., azimuth or elevation). The scanner module (1201) has a field of view of 5 degrees or better along the one angular dimension. And in embodiments with a two dimensional arrangement of the optical antennas (e.g., rectangular grid) signals from the plurality of optical antennas may be scanned in two dimensions within the field of view of the scanner module (1201). For example, scanning in a first dimension and a second dimension, and the scanner module (1201) field of view is at 5 degrees or better along the first dimension and is 5 degrees or better along the second dimension. Note that the two-dimensional scanning in the above example is done purely by selective use of different coherent pixels.

The scanner module (1201) may also include a scanner (1202) to assist laser beam scanning and/or a quarter-wave plate (QWP) (1204) to improve polarization-dependent sensitivity. The scanning mirror (1202) is a scanning mirror, e.g., as described above with regard to FIGS. 7b and c. In embodiments that use the scanning mirror (1202), the scanner module (1201) field of view is at 5 degrees or better along the first dimension (scanned via selective use of coherent pixels) and is 10 degrees or better along the second dimension (scanned at least in part via movement of the scanning mirror (1202)). A light source for the LiDAR chip (1205) can be integrated directly onto the same chip or coupled through fiber components. As shown, the light source a FMCW laser source (1207) that generates a frequency-modulated optical signal for FMCW LiDAR operation. The laser source (1207) can be further amplified by an optical amplifier (1206) to increase the range of the FMCW LiDAR. The optical amplifier can be a semiconductor optical amplifier (SOA) chip or a Erbium-doped fiber amplifier (EDFA). The FMCW laser source (1207) is controlled by a laser driver circuit (1208) which is typically a controllable low-noise current source. Outputs of the coherent pixels go to an array of transimpedance amplifier (TIA) circuits (1211). The on-chip switches are controlled by switch driver arrays (1210). The FMCW processing engine can be implemented with one or a plurality of FPGA, ASIC or DSP chips, which contains the following functionalities: SCPA control and calibration logic (1215), FMCW LiDAR frame management and point cloud processing (1214), multi-channel analog-to-digital convertors (1216), FMCW LiDAR DSP (1212), and FMCW laser chirp control and calibration logic (1213). In case of implementing the SCPA LiDAR chip (1205) with a CMOS silicon photonic platform, some or even all of the electrical circuit functionalities can be implemented monolithically with the photonic circuits on a single chip. The data output (1220) of the FMCW processing engine is depth information. Depth information may include, e.g., three dimensional position data of a typical LiDAR point cloud and other information that an FMCW LiDAR can measure such as velocity, reflectivity, etc.

As described above, wide FoV and fast pixel rates can be important for high-performance FMCW LiDAR systems. Note that the scanner module (1201) can target at least 100K points per second over the FoV of the scanning module (1201).

FIG. 12 shows an example LiDAR system. In alternative configurations, different and/or additional components may be included in the LiDAR system. Additionally, functionality described in conjunction with one or more of the components shown in FIG. 12 may be distributed among the components in a different manner than described in conjunction with FIG. 12. For example, in some embodiments, the SCPA LiDAR chip 1205 may be separate from the scanner module (1201).

Additional Configuration Information

The figures and the preceding description relate to preferred embodiments by way of illustration only. It should be noted that from the preceding discussion, alternative embodiments of the structures and methods disclosed herein will be readily recognized as viable alternatives that may be employed without departing from the principles of what is claimed.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A LIDAR sensor system comprising:
a laser source that is configured to generate a frequency modulated laser signal; and
a transceiver that includes:
a source input configured to receive the frequency modulated laser signal;
a coherent pixel array that includes a plurality of coherent pixels;
an optical switch configured to switchably couple the source input to the coherent pixel array, wherein at least one coherent pixel of the plurality of coherent pixels includes:
an input port coupled to the optical switch;
an optical antenna; and
a splitter coupled between the input port and the optical antenna, wherein the splitter is configured to:
split a received portion of the frequency modulated laser signal into a local oscillator signal and a transmit signal, wherein the transmit signal is emitted through the optical antenna and a reflection of the transmit signal is received through the optical antenna as a reflected signal; and
output a return signal that is a portion of the reflected signal.

2. The LIDAR sensor system of claim 1, wherein the at least one coherent pixel further includes:
a mixer coupled to receive the return signal and the local oscillator signal from the splitter, the mixer configured to mix the return signal and the local oscillator signal to generate one or more output signals.

3. The LIDAR sensor system of claim 2, further comprising:
one or more processors configured to determine depth information for a field of view of the transceiver based on the one or more output signals.

4. The LIDAR sensor system of claim 2, wherein the one or more output signals includes a quadrature output signal and an in-phase output signal for the return signal.

5. The LIDAR sensor system of claim 2, wherein the at least one coherent pixel further comprises at least one photodiode coupled to the mixer to provide the one or more output signals as electrical signals.

6. The LIDAR sensor system of claim 1, wherein a plurality of optical paths are respectively defined between the source input of the transceiver and the plurality of coherent pixels of the coherent pixel array.

7. The LIDAR sensor system of claim 1, wherein the at least one coherent pixel further includes:

a polarization assembly coupled between the splitter and the optical antenna, the polarization assembly configured to:
  couple an optical signal from a first waveguide to form the transmit signal; and
  polarize the transmit signal to have a first polarization;
  polarize the reflected signal based on a second polarization to form the return signal; and
  couple the return signal into a second waveguide for optical detection.

8. The LIDAR sensor system of claim 7, wherein the first polarization is orthogonal to the second polarization.

9. The LIDAR sensor system of claim 1, wherein the plurality of coherent pixels of the coherent pixel array are arranged in a linear array or a two-dimensional array.

10. The LIDAR sensor system of claim 1, wherein the optical switch comprises:
  a passive optical splitter that splits the frequency modulated laser signal between at least two optical paths.

11. The LIDAR sensor system of claim 1, wherein the optical switch comprises:
  an active optical splitter that switchably couples the frequency modulated laser signal to only one of at least two optical paths.

12. The LIDAR sensor system of claim 1, wherein the optical switch optically couples the frequency modulated laser signal to the coherent pixel array one coherent pixel at time over a scanning period of the LIDAR transceiver.

13. An automotive frequency modulated continuous wave (FMCW) LIDAR system comprising:
  a LIDAR chip including a FMCW LIDAR transceiver implemented on a photonic integrated circuit, the photonic integrated circuit comprising:
    a source input configured to receive a frequency modulated laser signal;
    a coherent pixel array that includes a plurality of coherent pixels;
    an optical switch configured to switchably couple the source input to the coherent pixel array, wherein at least one coherent pixel of the plurality of coherent pixels includes:
      an input port coupled to the optical switch;
      an optical antenna; and
      a splitter coupled between the input port and the optical antenna, wherein the splitter is configured to:
        split a received portion of the frequency modulated laser signal into a local oscillator signal and a transmit signal, wherein the transmit signal is emitted through the optical antenna and a reflection of the transmit signal is received through the optical antenna as a reflected signal; and
        output a return signal that is a portion of the reflected signal; and
    a lens system positioned to collimate the transmit signal emitted through the antenna, wherein the lens is also positioned to receive the reflected signal and couple the reflected signal to the optical antenna.

14. The automotive FMCW LIDAR system of claim 13, wherein the at least one coherent pixel further includes:
  a mixer coupled to receive the return signal and the local oscillator signal from the splitter, the mixer configured to mix the return signal and the local oscillator signal to generate one or more output signals used to determine depth information for a field of view of FMCW LIDAR.

15. The automotive FMCW LIDAR system of claim 14, wherein the at least one coherent pixel further comprises at least one photodiode coupled to the mixer to provide the one or more output signals as electrical signals.

16. The automotive FMCW LIDAR system of claim 13, wherein the at least one coherent pixel further includes:
  a polarization assembly coupled between the splitter and the optical antenna, the polarization assembly configured to:
    couple an optical signal from a first waveguide to form the transmit signal; and
    polarize the transmit signal to have a first polarization;
    polarize the reflected signal based on a second polarization that is orthogonal to the first polarization to form a return signal; and
    couple the return signal into a second waveguide for optical detection.

17. The automotive FMCW LIDAR system of claim 16, further comprising:
  a quarter wave plate positioned along an optical path of the emitted transmit signal, to convert the transmit signal from a first linear polarization to a circular polarization and is configured to convert the reflected signal from circular polarization to a second linear polarization that is orthogonal to the first linear polarization.

18. The automotive FMCW LIDAR system of claim 13, wherein the lens is configured to:
  project the transmit signal emitted from the antenna into a corresponding portion of a field of view of the FMCW LIDAR system; and
  provide the reflection of the transmit signal to the antenna.

19. The automotive FMCW LiDAR system of claim 13, wherein the plurality of coherent pixels of the coherent pixel array are arranged in a linear array, and the lens produces collimated transmitted signals that scan a transceiver field of view along one angular dimension.

* * * * *